United States Patent
Wei et al.

(10) Patent No.: US 11,807,259 B2
(45) Date of Patent: Nov. 7, 2023

(54) HARDWARE SYSTEMS FOR AN AUTONOMOUS VEHICLE

(71) Applicant: Nuro, Inc., Mountain View, CA (US)

(72) Inventors: Eric Jeffrey Wei, Santa Clara, CA (US); Niels Frommann, Santa Clara, CA (US); James Nicholas Vines, San Francisco, CA (US); Jonathan Beck, Mountain View, CA (US); An An (Tom) Chu, San Mateo, CA (US)

(73) Assignee: Nuro, Inc., Mountain View, CA (US)

( * ) Notice: Subject to any disclaimer, the term of this patent is extended or adjusted under 35 U.S.C. 154(b) by 50 days.

(21) Appl. No.: 17/537,307

(22) Filed: Nov. 29, 2021

(65) Prior Publication Data

US 2022/0169270 A1    Jun. 2, 2022

Related U.S. Application Data

(60) Provisional application No. 63/127,704, filed on Dec. 18, 2020, provisional application No. 63/119,341, filed on Nov. 30, 2020.

(51) Int. Cl.
| | | |
|---|---|---|
| *B60W 50/12* | (2012.01) | |
| *B60W 60/00* | (2020.01) | |
| *B60W 50/02* | (2012.01) | |
| *B60W 50/035* | (2012.01) | |
| *B60W 50/00* | (2006.01) | |

(52) U.S. Cl.
CPC ........ *B60W 50/02* (2013.01); *B60W 50/0205* (2013.01); *B60W 50/035* (2013.01); *B60W 60/001* (2020.02); *B60W 2050/0002* (2013.01)

(58) Field of Classification Search
CPC ............. B60W 50/12; B60W 50/0205; B60W 50/035; B60W 60/001; B60W 2050/0002; B60W 2050/0006; B60W 2556/35; B60W 50/029; B60W 2050/0292; B60W 50/023; B60W 2420/42; B60W 2420/52;
(Continued)

(56) References Cited

U.S. PATENT DOCUMENTS 10,114,103 B2 *  10/2018  Jones ..................... B60W 50/06
10,328,947 B1 *   6/2019  Hansel ................. G05D 1/0217
(Continued)

OTHER PUBLICATIONS

EU Long-Term Dataset with Multiple Sensors for Autonomous Driving (Year: 2020).*

*Primary Examiner* — Jeff A Burke
*Assistant Examiner* — Kyle T Johnson

(57) ABSTRACT

According to one aspect, a vehicle includes hardware systems configured to support the autonomous or semi-autonomous operation of the vehicle. Hardware systems may include a main compute, a brain stem computer (BSC), and an aggregator/compute arrangement or redundant autonomy compute. Such hardware systems may cooperate to allow the vehicle to operate autonomously, and typically provide capabilities, e.g., redundant and/or backup capabilities, configured to enable the vehicle to continue to operate in the event that a primary system is not functioning as expected. The aggregator/compute arrangement may further be comprised of two substantially identical modules or computing assemblies, each configured to process sensor data and perform backup autonomy functionalities and/or teleoperations functionalities.

21 Claims, 21 Drawing Sheets

(58) Field of Classification Search
CPC ............ B60W 60/0015; G05D 1/0038; G05D 2201/0213; G05D 1/0077
See application file for complete search history.

(56) References Cited

U.S. PATENT DOCUMENTS

| | | | |
|---|---|---|---|
| 10,331,128 B1* | 6/2019 | Hansel | H04L 9/3247 |
| 10,423,158 B1* | 9/2019 | Hadlich | G05D 1/0077 |
| 2005/0115753 A1* | 6/2005 | Pemberton | B62D 1/28 |
| | | | 180/167 |
| 2013/0179379 A1* | 7/2013 | Kurumisawa | B60W 30/16 |
| | | | 706/46 |
| 2017/0158175 A1* | 6/2017 | Fairfield | B60W 60/00276 |
| 2017/0192423 A1 | 7/2017 | Rust et al. | |
| 2018/0157220 A1* | 6/2018 | Pan | B64D 43/00 |
| 2018/0180444 A1* | 6/2018 | Cantaloube | G06F 3/0488 |
| 2018/0229738 A1* | 8/2018 | Nilsson | B60W 50/0205 |
| 2018/0267535 A1* | 9/2018 | Robert | B60W 60/0061 |
| 2018/0370540 A1 | 12/2018 | Yousuf et al. | |
| 2019/0009797 A1* | 1/2019 | Liu | B60W 50/029 |
| 2019/0204845 A1* | 7/2019 | Grossman | G01S 17/931 |
| 2019/0243363 A1* | 8/2019 | Kim | B60W 50/0205 |
| 2019/0258251 A1* | 8/2019 | Ditty | G06F 15/7807 |
| 2019/0324454 A1* | 10/2019 | Hansel | G05D 1/0077 |
| 2020/0125858 A1* | 4/2020 | Bauer | B60R 16/0315 |
| 2020/0156651 A1* | 5/2020 | Golov | B60W 50/029 |
| 2020/0164892 A1* | 5/2020 | Plecko | B60W 50/04 |
| 2020/0180653 A1* | 6/2020 | Chi | B60W 60/00182 |
| 2020/0201324 A1* | 6/2020 | Darayan | G05D 1/0077 |
| 2021/0163021 A1* | 6/2021 | Frazzoli | B60W 50/023 |
| 2022/0041058 A1* | 2/2022 | Nemeth | B60W 10/08 |
| 2022/0126872 A1* | 4/2022 | Han | B60W 50/023 |

\* cited by examiner

HARDWARE SYSTEMS FOR AN AUTONOMOUS VEHICLE

PRIORITY CLAIM

This patent application claims the benefit of priority under 35 U.S.C. § 119 to U.S. Provisional Patent Application No. 63/119,341, filed Nov. 30, 2020, titled "HARDWARE SYSTEMS FOR AN AUTONOMOUS VEHICLE" and to U.S. Provisional Patent Application No. 63/127,704, filed Dec. 18, 2020, titled "METHODS AND APPARATUS FOR PROVIDING A CAMERA AGGREGATOR FOR AN AUTONOMOUS VEHICLE"; the aforementioned priority applications being hereby incorporated by reference in their respective entireties.

TECHNICAL FIELD

The disclosure relates to providing systems for autonomous vehicles. More particularly, the disclosure relates to providing hardware systems and/or software to support operating the vehicles in an autonomous or a semi-autonomous manner.

BACKGROUND

The use of autonomous vehicles is growing. Autonomous vehicles may operate under the control of an autonomy system, or under the control of a remote operator, as for example via a teleoperations system. To enable autonomous vehicles to operate safely, systems of the autonomous vehicle that support control by an autonomy system and/or support control by a remote operator must generally be robust and provide redundancy.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
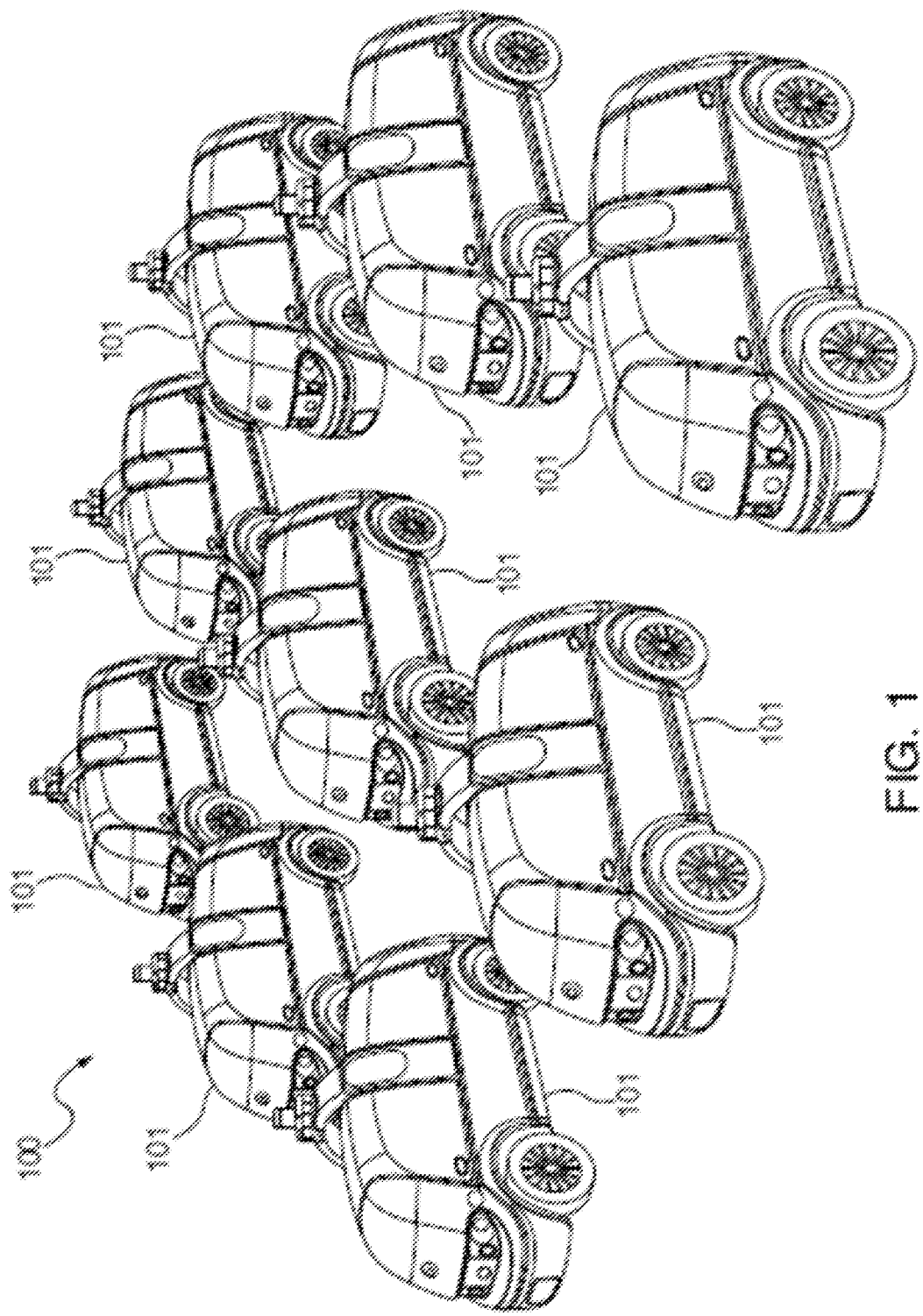
FIG. 1 is a diagrammatic representation of an autonomous vehicle fleet in accordance with an embodiment.

According to embodiments, a vehicle includes hardware systems configured to support the autonomous or semi-autonomous operation of the vehicle. Hardware systems may include a main compute, a brain stem computer (BSC), and an aggregator/compute arrangement or a redundant autonomy compute. Such hardware systems may cooperate to allow the vehicle to operate autonomously, and typically provide capabilities, e.g., redundant and/or backup capabilities, configured to enable the vehicle to continue to operate in the event that a primary system is not functioning as expected.

According to embodiments, autonomous vehicle may include a main compute and a secondary, or auxiliary, compute which provides functionality such as camera control and a redundant autonomy system. An aggregator/compute arrangement, or a camera aggregator, may be arranged to include separate, but substantially identical, printed circuit boards or modules which each control and/or obtain data from different cameras. The aggregator/compute arrangement may utilize a shared cooling arrangement that cools both boards or modules. Each board or module may include an image signal processor (ISP) that is used to increase the quality of images obtained by cameras. Such an ISP may be used in lieu of ISPs on system-on-modules (SOMs) or system-on-chips (SOCs) included in the aggregator/compute arrangement.

According to an embodiment, a vehicle that is capable of operating autonomously or semi-autonomously comprises a sensor data aggregator and a computing system. The sensor data aggregator includes a first computing assembly and a second computing assembly. The first computing assembly is configured to receive and to process a first set of sensor data from a first set of sensors and the second computing assembly is configured to receive and to process a second set of sensor data from a second set of sensors. The computing system is configured to (i) receive the first and second sets of sensor data processed by the sensor data aggregator and (ii) implement a set of primary autonomy functionalities of the vehicle based on the first and second sets of sensor data. The sensor data aggregator is further configured to implement a set of backup autonomy functionalities of the vehicle.

According to another embodiment, a vehicle that is capable of operating autonomously or semi-autonomously comprises a sensor data aggregator and a computing system. The sensor data aggregator includes a first computing assembly and a second computing assembly. The first computing assembly is configured to receive and to process a first set of sensor data from a first set of sensors and the second computing assembly is configured to receive and to process a second set of sensor data from a second set of sensors, and a computing system configured to (i) receive the first and second sets of sensor data processed by the sensor data aggregator and (ii) implement a set of primary autonomy functionalities of the vehicle based on the first and second sets of sensor data, wherein the sensor data aggregator is configured to implement a set of teleoperations functionalities to enable a remote operator to operate the vehicle.

According to yet another embodiment, a vehicle that is capable of operating autonomously or semi-autonomously comprises a computing system, a sensor data aggregator, a first switch, and a second switch. The computing system is configured to implement a set of primary autonomy functionalities of the vehicle. The sensor data aggregator is configured to receive and to process a first set of sensor data from a first set of sensors and a second set of sensor data from a second set of sensors. The sensor data aggregator is further configured to forward the processed first and second sets of sensor data to the computing system. The first switch is coupled to the computing system and the sensor data aggregator and is configured to forward a third set of sensor data generated by a third set of sensors to the sensor data aggregator and to the computing system. The second switch is coupled to the computing system and the sensor data aggregator and is configured to forward a fourth set of sensor data generated by a fourth set of sensors to the sensor data aggregator and to the computing system.

DESCRIPTION

Autonomous vehicles, which may include fully autonomous or semi-autonomous vehicles, generally include hardware systems which support the ability for vehicles to operate substantially in a driverless manner, e.g., without drivers onboard the vehicles. Such hardware may be arranged substantially within a vehicle, and may include hardware and/or software that facilitates the operation of systems within the vehicle.

Many systems of an autonomous vehicle may utilize sensors such as cameras to provide a view of an environment surrounding the autonomous vehicle. As such, the ability to control such sensors, and to provide backup systems which may enable some sensors to continue to function in the event that other sensors fail, is crucial to ensure that an autonomous vehicle may continue to operate safely even while facing some adversity. In one embodiment, hardware may be provided which allows cameras to be controlled by substantially separate modules such that the failure of one module allows cameras controlled by another module to continue to be used. Such hardware may further include other systems which provide efficiencies including, but not limited to including, backup systems such as a backup autonomy system.

An autonomous vehicle that includes hardware which supports autonomy and other functions may generally be part of a fleet of vehicles. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
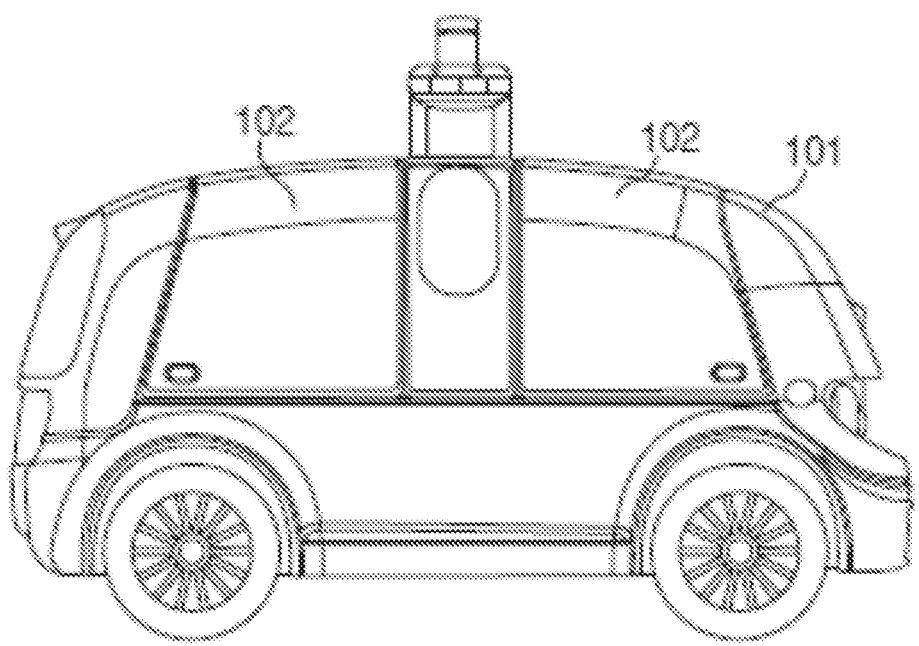
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
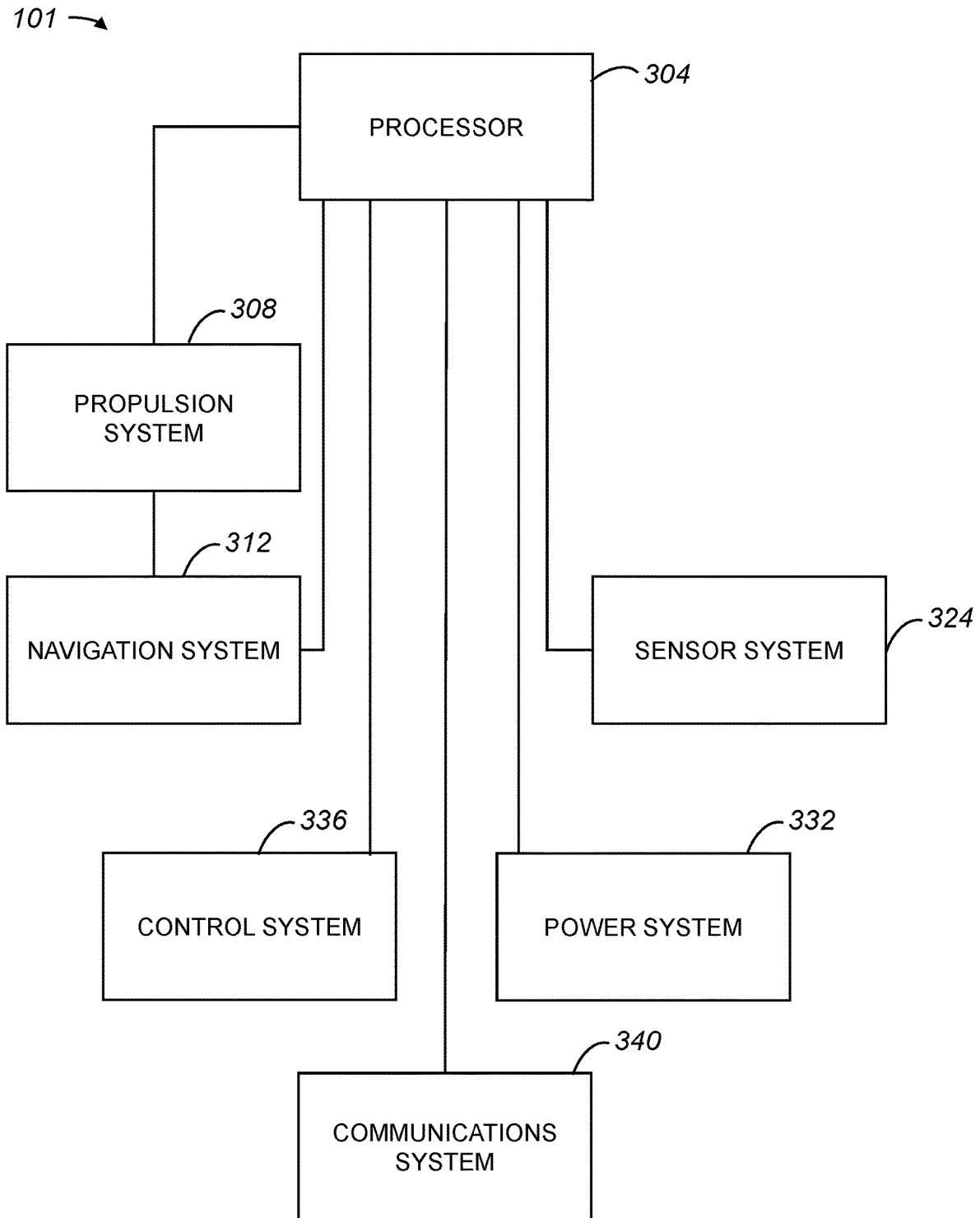
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be an internal combustion engine, a turbine engine, an electric motor, and/or a hybrid internal combustion and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

In general, processor 304, propulsion system 308, navigation system 312, sensor system 324, power system 332, control system 336, and communications system 340 may include hardware and software components. That is, the functionality of systems of autonomous vehicle 101 may be embodied as hardware and software components. With respect to FIG. 4, hardware included in an autonomous vehicle such as autonomous vehicle 101 will be described in accordance with an embodiment. It should be appreciated that such hardware may include components configured to effectively execute software or program code devices.

Autonomous vehicle 101' may include, but is not limited to including, a main compute 442, a brain stem computer (BSC) 446, and an aggregator/compute arrangement 450, e.g., a redundant autonomy compute or a camera aggregator. The aggregator/compute arrangement may also be referred to herein as a sensor data aggregator. Main compute 442 generally includes hardware which supports the operation of an autonomy system which allows vehicle 101' to operate in an autonomous matter. BSC 446 generally includes hardware which serves to act as the command center of vehicle 101'. Aggregator/compute arrangement 450, which may include an aggregator/compute arrangement and/or or a camera controller, generally includes hardware that may provide backup or additional support for systems of vehicle 101', e.g., main compute 442. Main compute 442 will be discussed in more detail below with respect to FIG. 4, BSC 446 will be discussed in more detail below with respect to FIG. 6, and aggregator/compute arrangement 450, which may be a "cameragator," generally includes a camera control system, will be discussed in more detail below with respect to, for example, FIGS. 10, 11A-11C, 15A, etc.

Hardware such as main compute 442, BSC 446, and aggregator/compute arrangement 450 may generally be included in vehicle 101' in addition to other hardware components. FIG. 5 is a block diagram representation of a main compute, e.g., main compute 442 of FIG. 4, in accordance with an embodiment. Main compute 442 includes a primary autonomy arrangement 542a and a data logging arrangement 542b. Primary autonomy arrangement 542a generally includes components, e.g., hardware components and/or software components, which allow a vehicle such as vehicle 101' of FIG. 4 to operate autonomously. Primary autonomy arrangement 542a may be configured to support autonomous driving at substantially any level defined by the Society of Automotive Engineers (SAE), as for example at Level 3 with conditional driving automation, Level 4 with high driving automation, and/or Level 5 with full driving automation. Data logging arrangement 542b may include memory which stores data collected as vehicle 101' of FIG. 4 operates. Such data may include, but is not limited to including, perception data and autonomy data. Data logging arrangement 542b may be configured as a removable storage drive or as a memory from which data may be downloaded, as for example over a wireless connection or over a wired connection such as an Ethernet connection. It should be appreciated that data logging arrangement 542b may include an input/output port which enables data to be offloaded.

In terms of functionality, the main compute 442 may implement, e.g., via the primary autonomy arrangement 542a, a set of primary autonomy functionalities, such as generating trajectories and commands for the vehicle to support autonomous driving as described herein. The main compute 442 may, for example, receive sensor data to implement the set of primary autonomy functionalities based on the sensor data.

Figure 4:
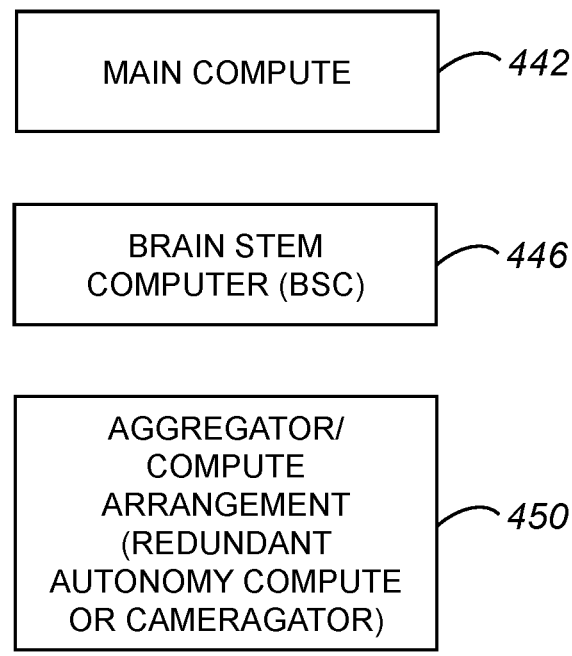
FIG. 4 is a block diagram representation of component hardware systems of an autonomous vehicle, e.g., autonomous vehicle 101 of FIGS. 2 and 3, in accordance with an embodiment.
Figure 5:
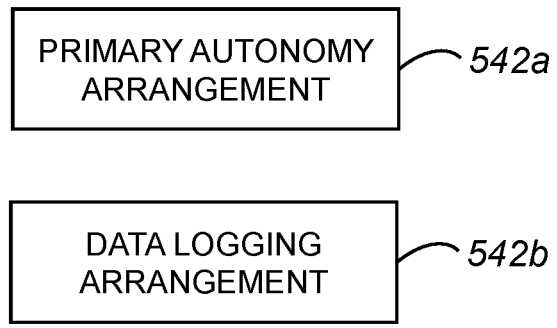
FIG. 5 is a block diagram representation of a main compute, e.g., main compute 442 of FIG. 4, in accordance with an embodiment.
Figure 6:
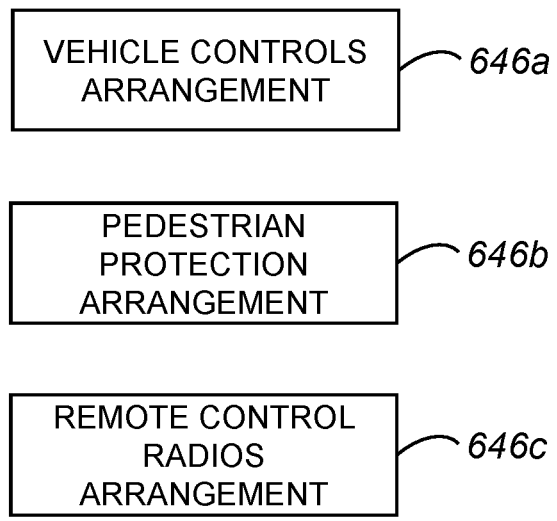
FIG. 6 is a block diagram representation of a brain stem computer (BSC), e.g., BSC 446 of FIG. 4, in accordance with an embodiment.

FIG. 6 is a block diagram representation of a BSC, e.g., BSC 446 of FIG. 4, in accordance with an embodiment. BSC 446 includes a vehicle controls arrangement 646a, a pedestrian protection arrangement 646b, and a remote control radios arrangement 646c. Arrangements 646a-c may include at least one processor and sensors such as at least one inertial measurement unit and wheel speed sensors.

Vehicle controls arrangement 646a may be configured to control vehicle steering, vehicle braking, vehicle propulsion, and/or vehicle power. Pedestrian protection arrangement 646b may be configured to control the activation, e.g., deployment, of safety systems including, but not limited to including, at least one external airbag arranged to protect a pedestrian who may come into contact with a vehicle such as vehicle 101' of FIG. 4. Remote control radios arrangement 646c includes transmitters and/or receivers which are configured to enable a remote operator with a remote control to provide input which effectively allows the remote operator to control functions of a vehicle such as vehicle 101' of FIG. 4.

Figure 7:
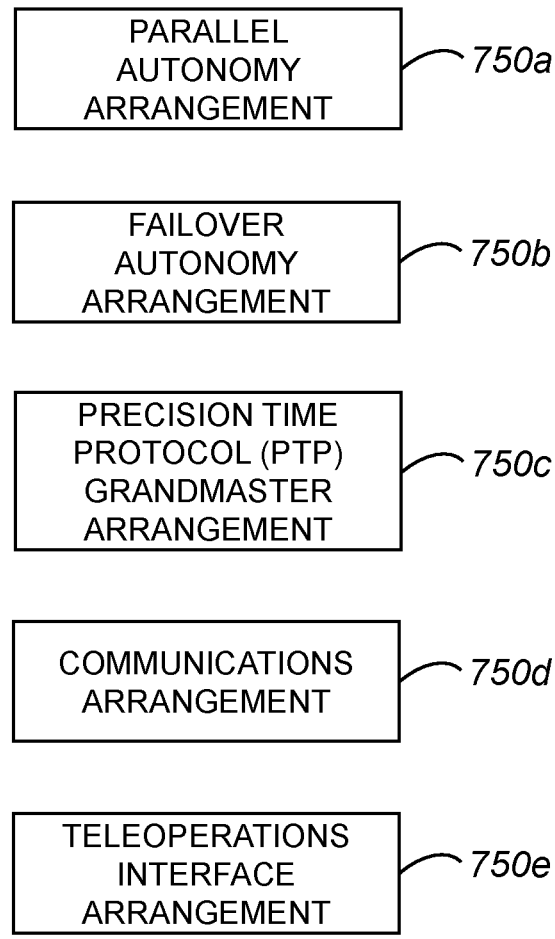
FIG. 7 is a block diagram representation of functionality associated with an aggregator/compute arrangement, e.g., aggregator/compute arrangement 450 of FIG. 4, in accordance with an embodiment.

FIG. 7 is a block diagram representation of an aggregator/compute arrangement or a redundant autonomy compute, e.g., aggregator/compute arrangement 450 of FIG. 4, in accordance with an embodiment. In certain embodiments, the aggregator/compute arrangement 450 may be a "cameragator." The aggregator/compute arrangement 450 may include a parallel autonomy arrangement 750a, a failover autonomy arrangement 750b, a precision time protocol (PTP) grandmaster arrangement 750c, a communications arrangement 750d, and a teleoperations interface arrangement 750e. In one embodiment, aggregator/compute arrangement 450 may be composed of substantially separate halves or power domains, as described below, and each half of aggregator/compute arrangement 450 may support parallel autonomy arrangement 750a, failover autonomy arrangement 750b, PTP grandmaster arrangement 750c, communications arrangement 750d, and teleoperations interface arrangement 750e. It should be appreciated, however that in another embodiment, halves may provide different capabilities, e.g., be associated with different arrangements 750a-e. For example, teleoperations system 750e may be associated with both halves, while parallel autonomy system 750a and failover autonomy system 750b may be associated with one half. Capabilities associated with arrangements 750a-e may be provided by components including, but not limited to including SOMs 672a, 672b of FIG. 6, SOMs 1521a, 1521b of FIG. 15A, or SOMs 1521a-1, 1521a-2, 1521b-1, 1521b-2 of FIGS. 17A-D.

Parallel autonomy arrangement 750a may include at least some functionality included in a primary autonomy arrangement (such as primary autonomy arrangement 542a of FIG. 5) provided by a main compute such as main compute 442 of FIG. 4. In one embodiment, parallel autonomy arrangement 750a may be configured to control the autonomous operation of a vehicle such as vehicle 101' of FIG. 4 in the event of an issue with a primary autonomy arrangement. Failover autonomy arrangement 750b may be configured to substantially institute failover measures in the event of an issue with a primary autonomy arrangement. For example, failover autonomy arrangement 750b may cause a vehicle such as vehicle 101' of FIG. 4 to pull over if the vehicle is unable to safely operate under autonomy, e.g., in an autonomous mode or state.

In one embodiment, the parallel autonomy arrangement 750a may selectively override trajectory or commands generated by the primary autonomy arrangement 542a provided or implemented by the main compute 442. For instance, the parallel autonomy arrangement 750a may implement a set of parallel autonomy functionalities concurrently with the primary autonomy arrangement 542a implementing the set of primary autonomy functionalities. The parallel autonomy functionalities implemented by the parallel autonomy arrangement 750 may include one or more of: generating parallel or alternate vehicle trajectory and/or commands based on sensor data, determining whether to override vehicle trajectory or commands generated by the primary autonomy arrangement 542a, and, in response to determining to override the primary autonomy arrangement 542a, controlling the vehicle using the parallel or alternate vehicle trajectory and/or commands.

In one embodiment, the failover autonomy arrangement 750b may implement a set of failover autonomy functionalities in response to detection of a fault associated with the primary autonomy arrangement 542a implementing the set of primary autonomy functionalities. The failover autonomy arrangement 750b may remain in a standby or dormant mode while the primary autonomy arrangement 542a operates the vehicle and may be configured to activate and take over control of the vehicle in response to a detected fault in the implementation of the primary autonomy functionalities (e.g., sensor fault, software fault, power failure, etc.). The failover autonomy functionalities may include generating failover trajectory and/or commands for the vehicle to cause the vehicle to perform a safe stop (e.g., slow down, stop, and pull over).

PTP grandmaster arrangement 750c is configured to provide time synchronization with respect to systems within a vehicle such as vehicle 101' of FIG. 4. Time synchronization provided by PTP grandmaster arrangement 750c ay enable data from different system to be substantially synchronized, e.g., data from different systems may be combined to provide a relatively accurate view of a state of a vehicle at a particular point in time.

Communications arrangement 750d includes, but is not limited to including, hardware which supports the ability for a vehicle such as vehicle 101' of FIG. 4 to communicate on a network. Such communications may be with, but are not limited to being with, a customer, a dispatcher, a server, and/or an enterprise. In one embodiment, communications arrangement 750d may include one or more cellular modems which support LTE communications or 3G/4G/5G communications. Communications arrangement 750d may also include hardware which supports global positioning system (GPS) communications, Ethernet communications, and Wi-Fi communications, and may be in communication with antennas onboard a vehicle such as vehicle 101' of FIG. 4.

Teleoperations interface arrangement 750e is configured to enable communications between a teleoperations system and a vehicle such as vehicle 101' of FIG. 4. Teleoperations interface arrangement 750e may provide camera streams, or data streams from cameras (not shown), to a teleoperations system or a system which may remotely operate a vehicle such as vehicle 101' of FIG. 4. In one embodiment, teleoperations interface arrangement 750e includes hardware and/or software which process data obtained from cameras (not shown), enables a remote teleoperator to control vehicle operations, and may support communications with the remote teleoperator through communications arrangement 750d. By way of example, one or more modems included in communications arrangement 750d may be used by teleoperations interface arrangement 750e to allow for communications between teleoperations interface arrangement 750e and a teleoperations system. Such communications may generally include, but are not limited to including, sending data streams from cameras (not shown) to a teleoperations system.

As described in detail below, in some embodiments, an aggregator/compute arrangement such as the aggregator/compute arrangement 450 of FIG. 4 may comprise two or more computing assemblies (e.g., two halves of the aggregator/compute arrangement 450). Each of the two or more computing assemblies of the aggregator may be powered by a respective low-voltage power domain. In certain implementations, each of the two or more computing assemblies of the aggregator/compute arrangement may, separately or in conjunction, implement the parallel autonomy arrangement 750a, the failover autonomy arrangement 750b, and/or the teleoperations interface arrangement 750e.

In an embodiment, a teleoperations interface arrangement such as teleoperations interface arrangement 750e may be arranged to be supported by both halves of an aggregator/compute arrangement such that in the event that one half of the aggregator/compute arrangement becomes non-functional, the teleoperations interface arrangement may still function. The ability for a teleoperations interface arrangement to remain at least partially functional may enable a vehicle to be safely driven, as for example driven until the vehicle may be brought to a safe stop. For example, while the quality of images obtained and transmitted by the teleoperations interface arrangement may be degraded, the images may still be sufficient for use by a teleoperations system which receives images from the teleoperations interface arrangement. Additional details regarding these features are described with respect to FIGS. 14A and 14B.

Figure 8:
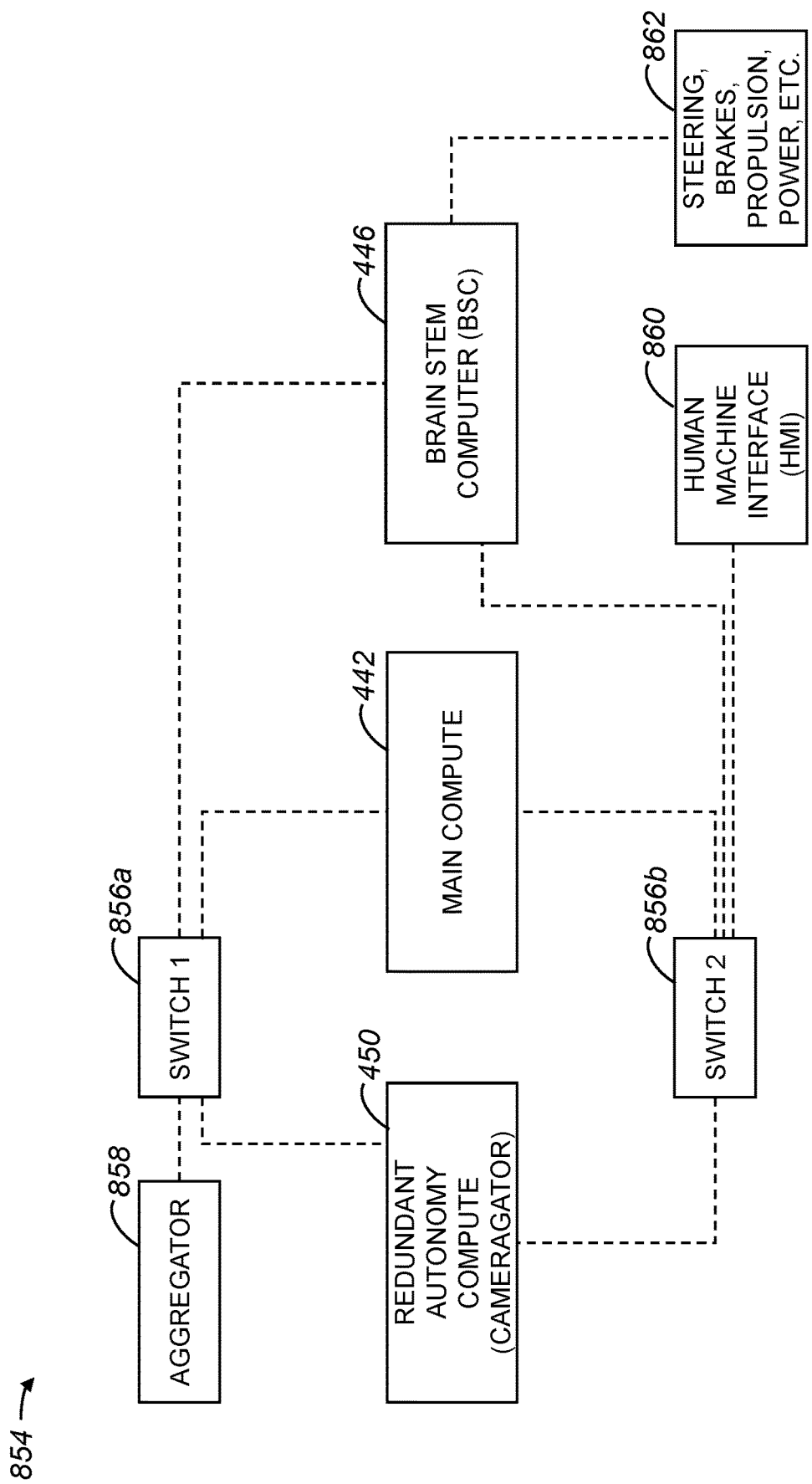
FIG. 8 is a block diagram representation of a first overall hardware system of an autonomous vehicle in accordance with an embodiment.

Hardware such as main compute 442, BSC 446, and aggregator/compute arrangement 450 of FIG. 4 may generally be included in vehicle 101' in addition to other hardware components. FIG. 8 is a block diagram representation of a first overall hardware system of an autonomous vehicle in accordance with an embodiment. A first overall hardware system 854 which may be included in an autonomous vehicle includes main compute 442, BSC 446, and aggregator/compute arrangement 450. First overall hardware system 854 also includes switch 856a, a switch 856b, an aggregator 858, a human machine interface (HMI), and mechanical systems 862.

Switches 856a, 856b may each be coupled to main compute 442, BSC 446, and aggregator/compute arrangement 450. Switches 856a, 856b may be Ethernet switches, and may be arranged such that sensors and devices associated with main compute 442, BSC 446, and aggregator/compute arrangement 450 may be substantially split. The splitting of sensors and devices associated with switches 856a, 856b effectively enables single point fault tolerance.

Switch 856a is further coupled to aggregator 858, while switch 856b is further coupled to HMI 860. Switch 856a may enable a PTP grandmaster to send a pulse per second (PPS) signal. Aggregator 858, which may be an aggregator of short range devices, may include a processor and may interface with various sensors (not shown) including, but not limited to including, ride height sensors, microphones, a universal serial interface (USS), and/or a short range lidar. In one embodiment, aggregator 858 may provide outputs used by a pump/flow control unit, a short range camera clearing fan and/or a short range lidar clearing fan. HMI 860 may include interfaces which allow a human to interact with a vehicle such as vehicle 101' of FIG. 4. HMI 860 may include, but is not limited to including, a touchscreen, at least one camera, a user experience microphone, and/or a user experience speaker.

Mechanical systems 862 are arranged to be substantially controlled or otherwise operated by BSC 446. In one embodiment, mechanical systems 862 include steering, brakes, propulsion, and power systems.

An aggregator/compute arrangement such as aggregator/compute arrangement 450 of FIG. 4 may be arranged as two or more physical portions such that an issue affecting one physical portion typically does not adversely affect other physical portions. For example, hardware associated with an aggregator/compute arrangement may be divided into two separate halves or four separate quarters. The two halves may, in one embodiment, be substantially the same in that the two halves may include approximately the same layouts, and components. Each of the halves may include one or more system-on-modules (SOMs) or system-on-chips (SOCs). While the SOMs and/or SOCs may serve different functions, the physical locations of the SOMs and/or SOCs on each half may be substantially the same. That is, while each physical portion of an aggregator/compute arrangement may include substantially the same layouts and components, the components may be configured to support or to otherwise provide different functions.

By effectively dividing an aggregator/compute arrangement into separate physical halves which are effectively the same, the aggregator/compute arrangement may be relatively easy to manufacture, and relatively easy to troubleshoot in the event of a failure. Further, costs associated with manufacturing the aggregator/compute arrangement may be reduced when the aggregator/compute arrangement includes two or more modules, e.g., printed circuit boards (PCBs), that are substantially the same.

Figure 9:
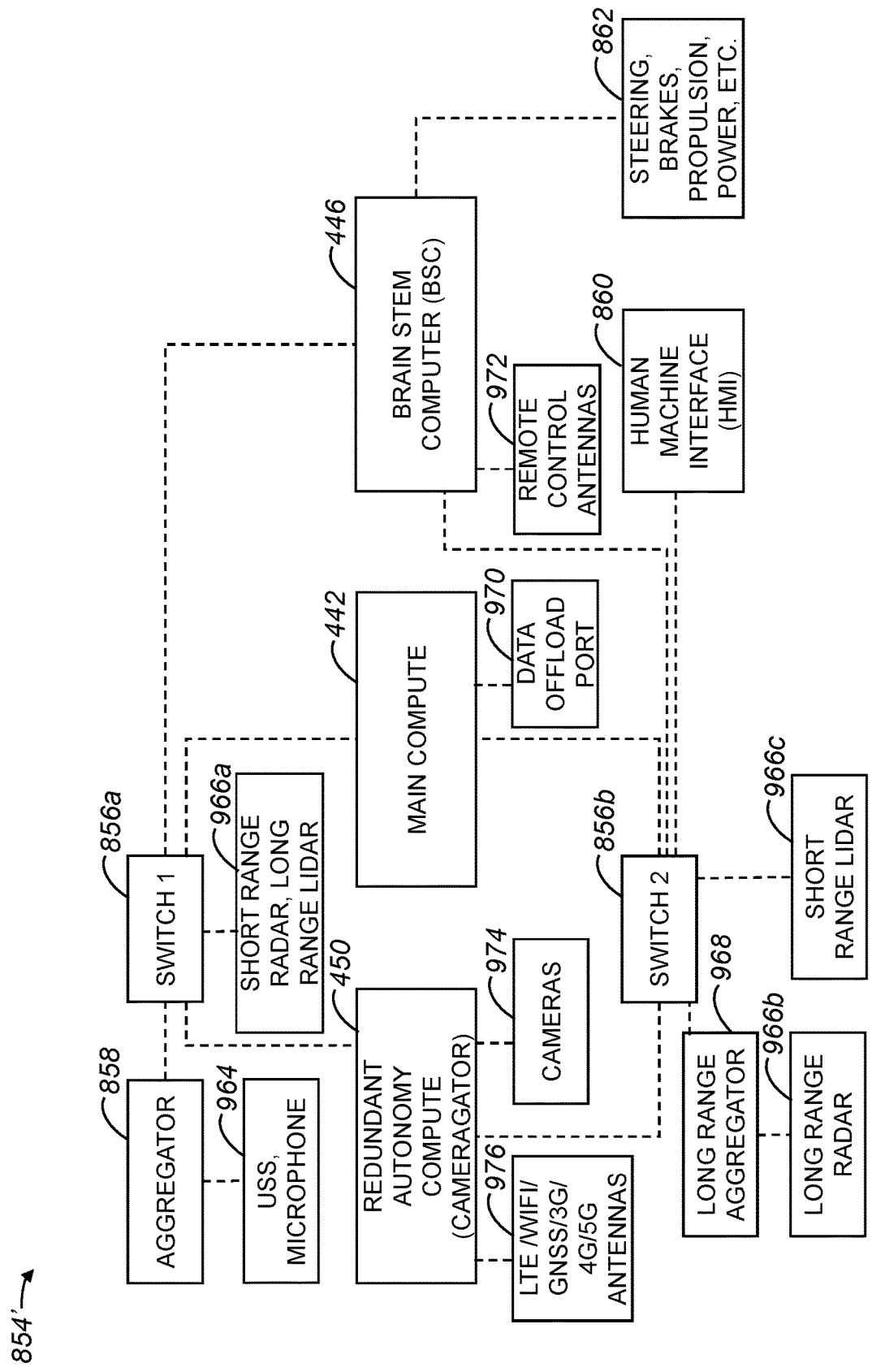
FIG. 9 is a block diagram representation of a second overall hardware system of an autonomous vehicle in accordance with an embodiment.

With reference to FIG. 9, overall hardware system 854 of an autonomous vehicle will be described in more detail in accordance with an embodiment. Overall hardware system 854' depicts hardware system 854 with additional components. Aggregator 858 is coupled to a components 964 including, but not limited to including, a USS and a microphone.

Switches 856a, 856b may be configured such that each switch is associated with some long range components and with some short range components to provide single point fault tolerance. When each switch 856a, 856b is coupled to some long range components and some short range components, if one switch 856a, 856b suffers a fault or effectively fails, then the remaining switch 856a, 856b may function to provide some long range functionality and some short range functionality. In the embodiment as shown, switch 856a may be associated with a short range radar and a long range lidar 966a, while switch 856b may be associated with a short range lidar 966c and with a long range aggregator 968 that is coupled to a long range radar 966b.

Main compute 442 may be coupled to or include a data offload port 970 that enables data stored in main compute 442 to be downloaded or offloaded. Such downloading or offloading may be facilitated through the use of an Ethernet connection (not shown). Alternatively, data offload port 970 may support wireless downloading or offloading of data stored in main compute 442.

BSC 446 may be coupled to remote control antennas 972 which enables a remote control radio arrangement, e.g., remote control radio arrangement 646c of FIG. 6, to receive and to transmit data to a remote control. That is, remote control antennas 972 effectively enable a remote control radio arrangement of BSC 446 to obtain data from a remote control and/or to provide data to the remote control.

Aggregator/compute arrangement 450 is coupled to cameras 974 and to at least one antenna 976. Cameras 974 may include, but are not limited to including, long range and short range cameras. At least one antenna 976 may include, but is not limited to including, an LTE antenna, a Wi-Fi antenna, a 3G/4G/5G antenna. and/or a global navigation satellite system (GNSS) antenna.

An aggregator/compute arrangement such as aggregator/compute arrangement 450 of FIG. 4 may be arranged as two or more physical portions such that an issue affecting one physical portion typically does not adversely affect other physical portions. For example, hardware associated with an aggregator/compute arrangement may be divided into two separate halves or four separate quarters. The two halves may, in one embodiment, be substantially the same in that the two halves may include approximately the same layouts, and components. Each of the halves may include one or more system-on-modules (SOMs) or system-on-chips (SOCs). While the SOMs and/or SOCs may serve different functions, the physical locations of the SOMs and/or SOCs on each half may be substantially the same. That is, while each physical portion of an aggregator/compute arrangement may include substantially the same layouts and components, the components may be configured to support or to otherwise provide different functions.

By effectively dividing an aggregator/compute arrangement into separate physical halves which are effectively the same, the aggregator/compute arrangement may be relatively easy to manufacture, and relatively easy to troubleshoot in the event of a failure. Further, costs associated with manufacturing the aggregator/compute arrangement may be reduced when the aggregator/compute arrangement includes two or more modules, e.g., printed circuit boards (PCBs), that are substantially the same.

Figure 10:
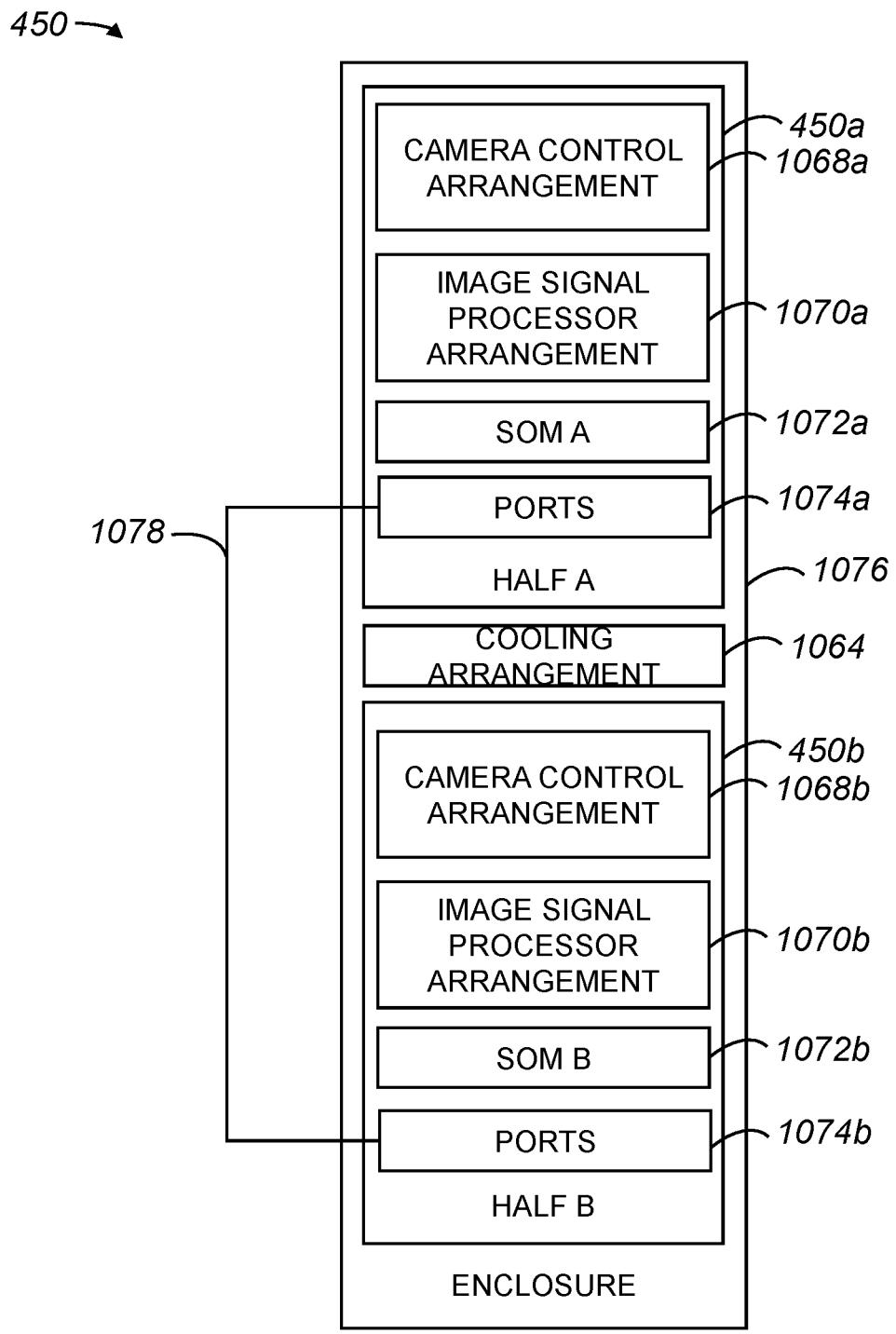
FIG. 10 is a block diagram representation of an aggregator/compute arrangement, e.g., aggregator/compute arrangement 450 of FIG. 4, in accordance with an embodiment.

FIG. 10 is a block diagram representation of an aggregator/compute arrangement, e.g., aggregator/compute arrangement 450 of FIG. 4, in accordance with an embodiment. Aggregator/compute arrangement 450 includes a first half 450a and a second half 450b. In one embodiment, first half 450a and second half 450b are substantially separate, and are both contained within an enclosure 1076. Within enclosure 1076, first half 450a and second half 450b may be aligned such that a top surface of first half 450a effectively faces a top surface of second half 450b, as will be discussed below with respect to FIGS. 11A to 11C.

First half 450a a includes a camera control arrangement 1068a, an image signal processor (ISP) arrangement 1070a, a SOM 1072a, and a plurality of ports 1074a. Second half 450b includes a camera control arrangement 1068a, an ISP arrangement 1070b, a SOM 1072b, and a plurality of ports 1074b.

Camera control arrangements 1068a, 1068b enable cameras (not shown), as for example cameras associated with a vehicle such as vehicle 101 of FIGS. 2 and 3 to, be controlled. Camera control arrangement 1068a may generally be associated with a different set of cameras than camera control arrangement 1068b. ISPs 1070a, 1070b may, in one embodiment, provide image processing capabilities which enhance images captured by cameras (not shown) controlled using camera control arrangement 1068a, 1068b. SOMs 1072a, 1072b provide processing capabilities. Ports 1074a, 1074b enable connections to be made between aggregator/compute arrangement 450 and other components of a vehicle such as vehicle 101 of FIGS. 2 and 3. In one embodiment, ports 1074a, 1074b allow halves 450a, 450b to be communicably coupled via a cable 1078.

A cooling arrangement 1064 may be used to generally provide cooling within aggregator/compute arrangement 450. Cooling arrangement 1064, in one embodiment, may provide cooling to both halves 450a, 450b. It should be appreciated that while halves 450a, 450b may each include a dedicated cooling component, as for example a fan (not shown), cooling arrangement 1064 may be utilized as a primary cooling system for halves 450a, 450b. In one embodiment, cooling arrangement 1064 may include, but is not limited to including, a heat sink that is physically positioned between halves 450a, 450b. Such a heat sink may include, but is not limited to including, a cooling plate and/or coils through which a coolant may flow. In general, enclosure 1076 may also function as a heat sink.

Figure 11A:
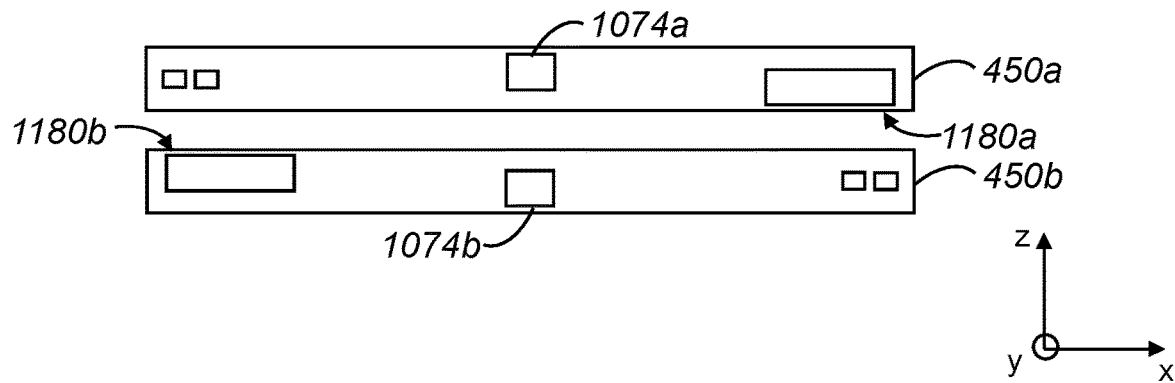
FIG. 11A is a diagrammatic representation of two substantially identical portions, e.g., halves 450a and 450b of FIG. 10, of an aggregator/compute arrangement in accordance with an embodiment.

Halves 450a, 450b as previously mentioned, may be positioned in enclosure 1076 such that a top surface of each half 450a, 450b substantially face each other. FIG. 11A is a diagrammatic side-view representation of halves 450a, 450b in accordance with an embodiment. Half 450a includes at least one port 1074a and half 450b includes at least one port 1074b. Ports 1074a, 1074b may generally be connector receptacles, or mechanisms arranged to engage or to otherwise receive a connector such as a cable.

Half 450a includes a top surface 1180a, and half 450b includes a top surface 1180b. Top surfaces 1180a, 1180b have substantially the same layout, e.g., top surfaces 1180a, 1180b include substantially the same components and/or substantially the same traces or electrical connections. When assembled in an enclosure (not shown), top surface 1180a and top surface 1180b face each other, or are oriented or otherwise arranged such that they are substantially adjacent to each other. That is, half 450a may be in a first orientation while half 450b is in a second orientation that is effectively flipped approximately one-hundred-eighty degrees from the first orientation.

Figure 11B:
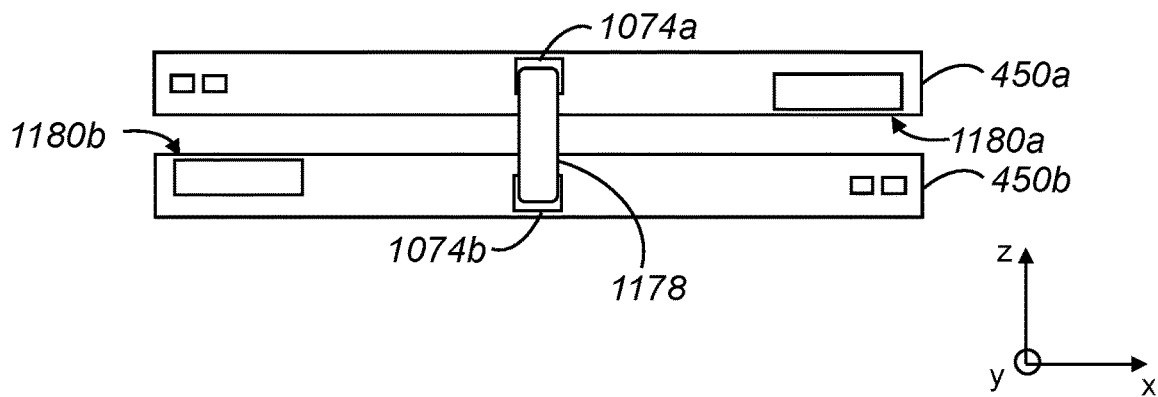
FIG. 11B is a diagrammatic representation of two substantially identical portions, e.g., halves 450a and 450b of FIG. 11A, of an aggregator/compute arrangement that are coupled using an external cable arrangement in accordance with an embodiment.

In one embodiment, halves 450a, 450b are not communicably coupled. That is, half 450a and half 450b, when positioned within an enclosure (not shown), are not directly communicably connected. To connect halves 450a, 450b, a connector, as for example a cable, may be utilized. Referring next to FIG. 11B, the coupling of halves 450a, 450b using a cable arrangement will be described in accordance with an embodiment. Ports 1074a, 1074b are configured to accept ends of a connector which may be a cable arrangement 1178. Cable arrangement 1178 may be plugged into or otherwise interfaced with ports 1074a, 1074b to effectively communicably couple and/or electrically couple halves 450a, 450b. While cable arrangement 1178 typically allows halves 450a, 450b to communicate, it should be understood that in some instances, cable arrangement 1178 may be arranged to provide a mechanical connection between halves 450a, 450b, substantially without supporting communications.

Cable arrangement 1178 may generally be any suitable cable arrangement. In general, ports 1074a, 1074b have substantially the same configuration. As such, cable arrangement 1178 may include connector ends which are substantially the same. For example, if ports 1074a, 1074b include male connector interfaces, cable arrangement 1178 may include female connector interfaces configured to couple with the male connector interfaces. In one embodiment, cable arrangement 1178 may be arranged to be positioned externally with respect to an enclosure (not shown) which contains halves 450a, 450b.

Figure 11C:
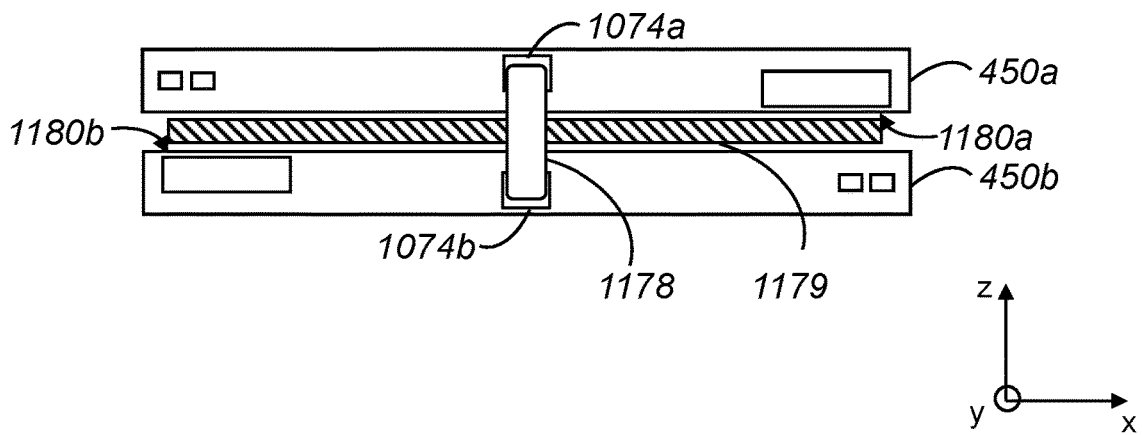
FIG. 11C is a diagrammatic representation of two substantially identical portions, e.g., halves 450a and 450b of FIGS. 11A and 11B, of an aggregator/compute arrangement that are arranged around a cooling arrangement in accordance with an embodiment.

As previously mentioned, a cooling arrangement may be positioned substantially between halves of an aggregator/compute arrangement. FIG. 11C shows halves 450a and 450b with a cooling arrangement therebetween in accordance with an embodiment. A cooling arrangement 1179 is positioned in a gap or space between top surface 1180a of half 450a and top surface 1180b of half 450b. Cooling arrangement 1179 may be any suitable arranged that is configured to draw heat away from halves 450a, 450b. For example, cooling arrangement 1189 may be, but is not limited to being, a heat sink, a cooling plate, pipes, or coils through which a liquid coolant may circulate, and/or a fan mechanism which blows air between top surface 1180a and top surface 1180b.

Figure 12:
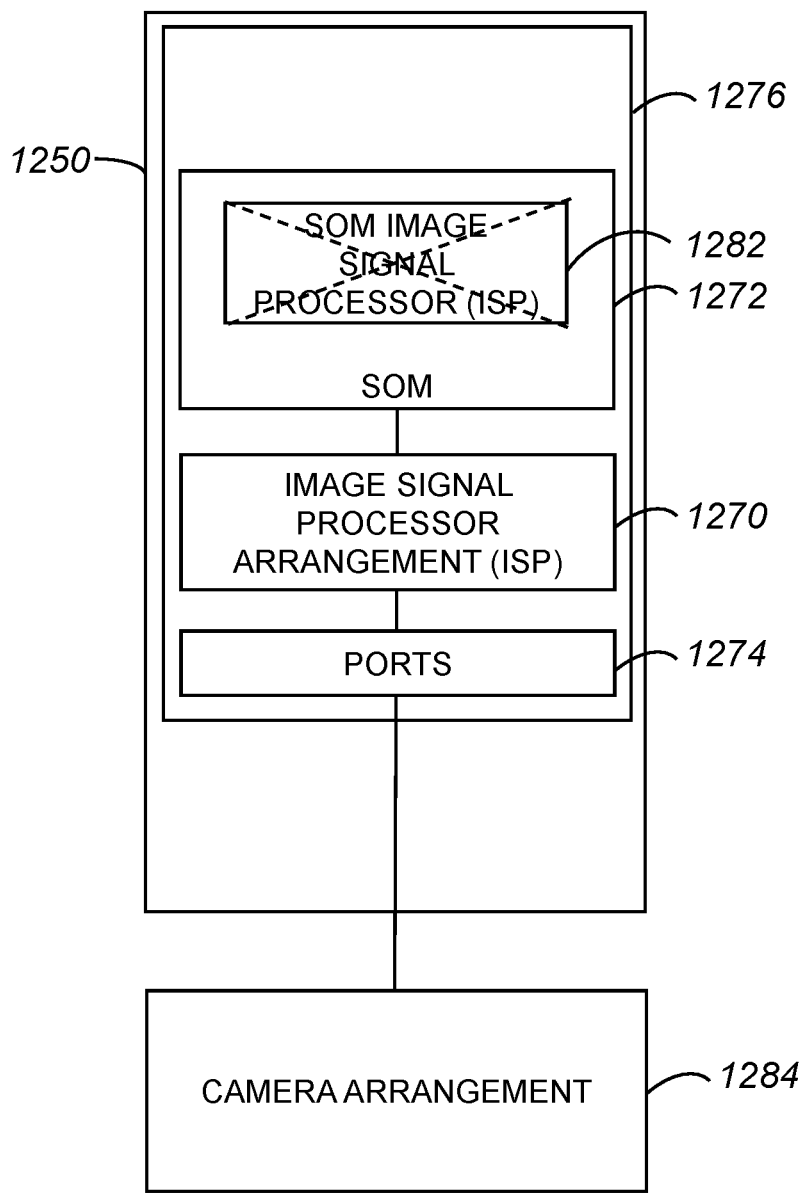
FIG. 12 is a block diagram representation of an aggregator/compute arrangement which includes an image signal processor (ISP) arrangement in accordance with an embodiment.

An aggregator/compute arrangement may include ISPs which are configured to enhance the quality associated with images obtained from sensors, e.g., cameras, which are substantially controlled by the aggregator/compute arrangement. The ISPs include in the aggregator/compute arrangement may be used in lieu of ISPs provided in SOMs of the aggregator/compute arrangement. FIG. 12 is a block diagram representation of an aggregator/compute arrangement which includes ISP arrangements in accordance with an embodiment. An aggregator/compute arrangement 1250 includes an enclosure 1276 which contains at least one SOM 1272, at least one ISP 1270, and ports 1274. In one embodiment, SOM 1272, ISP 1270, and ports 1274 are part of a portion or half of aggregator/compute arrangement 1250.

Aggregator/compute arrangement 1250 is in communication with a camera arrangement 1284, as for example through ports 1274. Camera arrangement 1284 may include any number of cameras, and may be controlled by aggregator/compute arrangement 1250. Images taken or otherwise collected by camera arrangement 1284 may be processed by SOM 1272.

In one embodiment, although SOM 1272 may include an onboard ISP 1282, onboard ISP 1282 may effectively be bypassed such that signal processing is not provided by onboard ISP 1282 but is, instead, provided by ISP 1270. That is, SOM 1272 generally does not perform any image processing. Typically, ISP 1270 has better image processing capabilities than onboard ISP 1282. By way of example, ISP 1270 may be configured to enhance images taken in relatively poor lighting conditions, while onboard ISP 1282 may not be able to compensate for the relatively poor lighting conditions.

Figure 13:
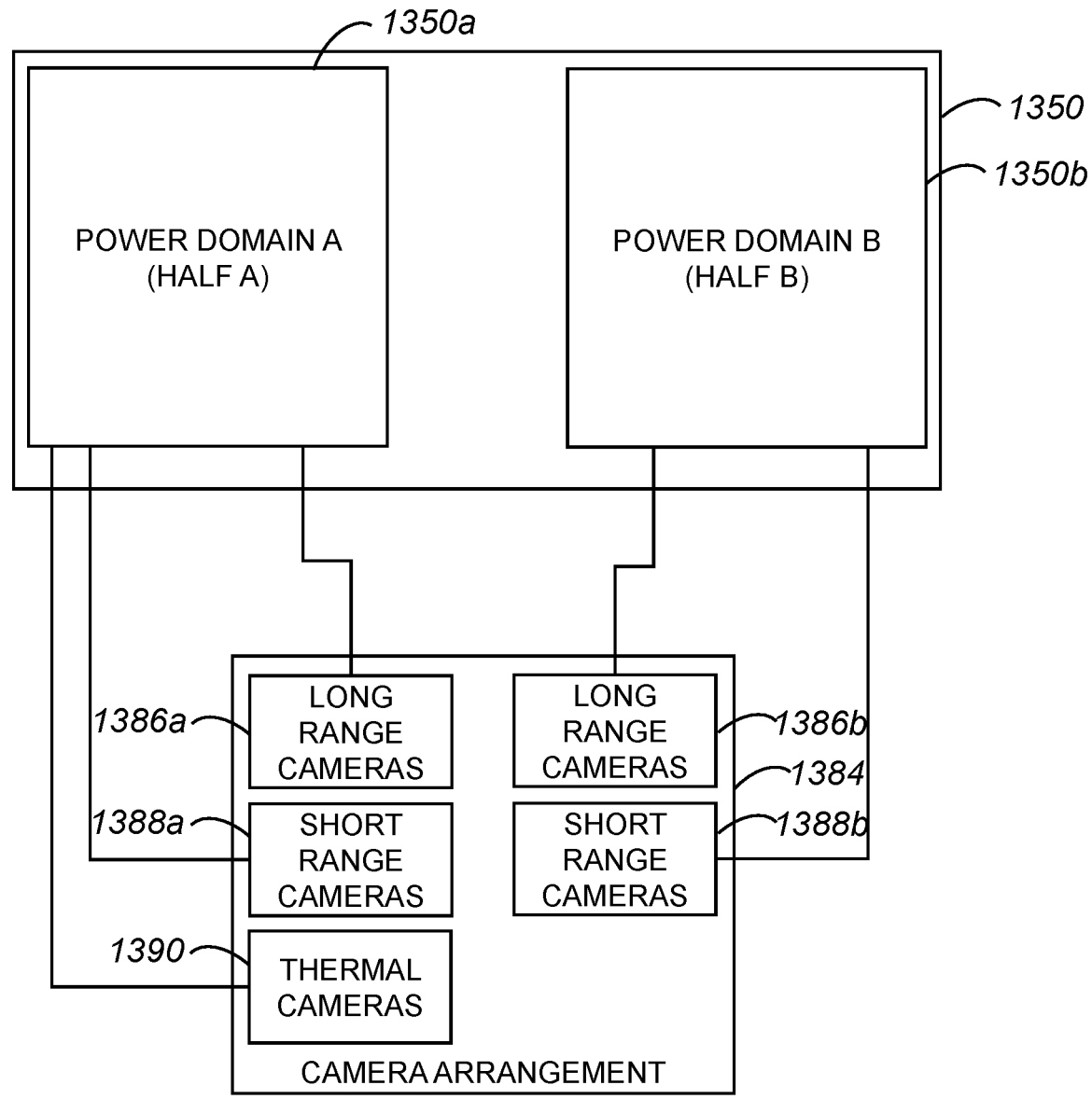
FIG. 13 is a block diagram representation of an aggregator/compute arrangement which includes two portions which each are each associated with sets of cameras in accordance with an embodiment.

A camera arrangement such as camera arrangement 1284 may generally include groups or sets of cameras which may be associated with different portions, e.g., halves, of an aggregator/compute arrangement such as aggregator/compute arrangement 1250. FIG. 13 is a block diagram representation of an aggregator/compute arrangement which includes two portions which each are each associated with sets of cameras in accordance with an embodiment. An aggregator/compute arrangement 1350 may include halves of power domains 1350a, 1350b. In general, aggregator/compute arrangement 1350 communicates with a camera arrangement 1384.

Camera arrangement 1384 includes, but is not limited to including, long range cameras 1386a, 1386b and short range cameras 1388a, 1388b which may provide feeds, or images, which may be used to facilitate the operation of a vehicle which includes aggregator/compute arrangement 1250 and camera arrangement 1384. For example, feeds provided by camera arrangement 1384 may be used to facilitate the teleoperation of a vehicle. In one embodiment, camera arrangement 1384 includes at least one thermal camera 1390.

The number of long range cameras 1386a, 1386b and short range cameras 1388a, 1388b may vary widely. In one embodiment, camera arrangement 1384 may include a total of approximately ten total long range cameras 1386a and short range cameras 1388a, and approximately seven total long range cameras 1386b and short range cameras 1388b. It should be appreciated that in another embodiment, camera arrangement 1384 may include approximately eight long range cameras 1386a, 1386b and approximately eight short range cameras 1388a, 1388b.

Half 1350a may be configured to control, and to obtain data from, long range cameras 1386a, short range cameras 1388a, and at least one thermal camera 1390. Similarly, half 1350b may be configured to control, and to obtain data from, long range cameras 1386b and short range cameras 1388b. As half 1350a substantially controls and obtains data from long range cameras 1386a, 1388a, and half 1350b substantially controls and obtains data from short range cameras 1386b, 1388b, in the event that one half 1350a, 1350b is not functioning as expected, the other half 1350a, 1350b may provide sufficient camera data that enables a vehicle to continue to operate, e.g., using teleoperations. That is, as each half 1350a, 1350b has associated long range cameras 1386a, 1386b and short range cameras 1388a, 1388b, in the event that substantially only one half 1350a, 1350b is functional, both long range and short range camera data may continue to be obtained.

Figure 14A:
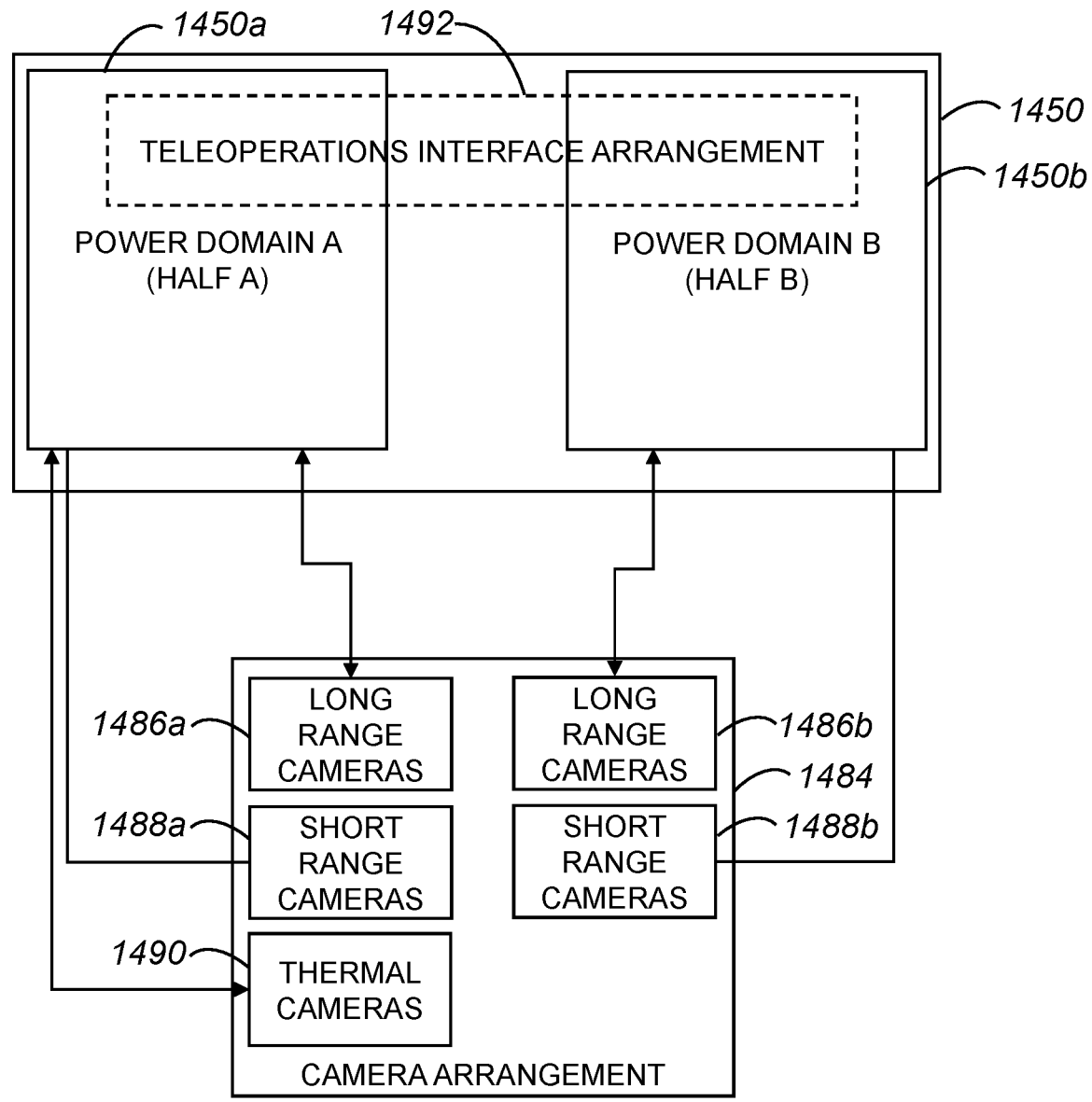
FIG. 14A is a block diagram representation of an aggregator/compute arrangement which includes a teleoperations interface arrangement associated with two portions at a time t1 in accordance with an embodiment.

FIG. 14A is a block diagram representation of an aggregator/compute arrangement which includes a teleoperations interface arrangement associated with two portions at a time t1 when an aggregator/compute arrangement is substantially fully functional in accordance with an embodiment. An aggregator/compute arrangement 1450 includes a first power domain or half 1450a and a second power domain or half 1450b. Aggregator/compute arrangement 1450 is generally configured to control a camera arrangement 1484, and to obtain data such as image data from camera arrangement 1484. As shown, an teleoperations interface arrangement 1492 is supported by both halves 1450a, 1450b.

Camera arrangement 1484 generally includes long range cameras 1486a, 1486b and short range cameras 1488a, 1488b. Long range cameras 1486a, 1486b may capture or otherwise obtain images at a higher resolution than short range cameras 1488a, 1488b. Camera arrangement also includes one or more thermal cameras 1490. Generally, thermal cameras 1490 are not controlled or substantially used by teleoperations interface arrangement 1492. In the embodiment as shown, half 1450a effectively commands and obtains data from long range cameras 1486a, short range cameras 1488a, and thermal cameras 1490, while half 1450 effectively commands and obtains data from long range cameras 1486a, and short range cameras 1488b.

The number of cameras included in camera arrangement 1484 may vary widely. In one embodiment, camera arrangement 1484 may include approximately seventeen cameras, although it should be appreciated that the number of cameras may vary and is not limited to including approximately seventeen cameras. The number of cameras substantially controlled by halves 1450a, 1450b may also vary widely. For example, half 1450a may command and obtain data from approximately ten total long range cameras 1486a, short range cameras 1488a, and thermal cameras 1490, while half 1450b may command and obtain data from approximately seven total long range cameras 1486b and short range cameras 1488b.

At a time t1, teleoperations interface arrangement 1492 is substantially fully functional. In other words, halves 1450a, 1450b are both functioning to support teleoperations interface arrangement 1492 at time t1. When halves 1450a, 1450b are both essentially fully functional, long range cameras 1486a, 1486b may provide a substantially full view of the environment surrounding a vehicle, e.g., vehicle 101' of FIG. 4, which includes camera arrangement 1484. When long range cameras 1486a, 1486b are substantially all providing visual or image data to teleoperations interface arrangement 1492, short range cameras 1488a, 1488b may not necessarily provide visual or image data, as indicated in FIG. 11A. That is, when long range cameras 1486a, 1486b are all providing data to halves 1450a, 1450b, respectively, short range cameras 1488a, 1488b may not need to be utilized. It should be appreciated, however, that in some embodiments, short range cameras 1488a, 1488b may provide data that may supplement data obtained from long range cameras 1486a, 1486b. By way of example, data from short range cameras 1488a, 1488b may be substantially superimposed onto an overall image created by teleoperations interface arrangement 1492 using data obtained from long range cameras 1486a, 1486b.

Figure 14B:
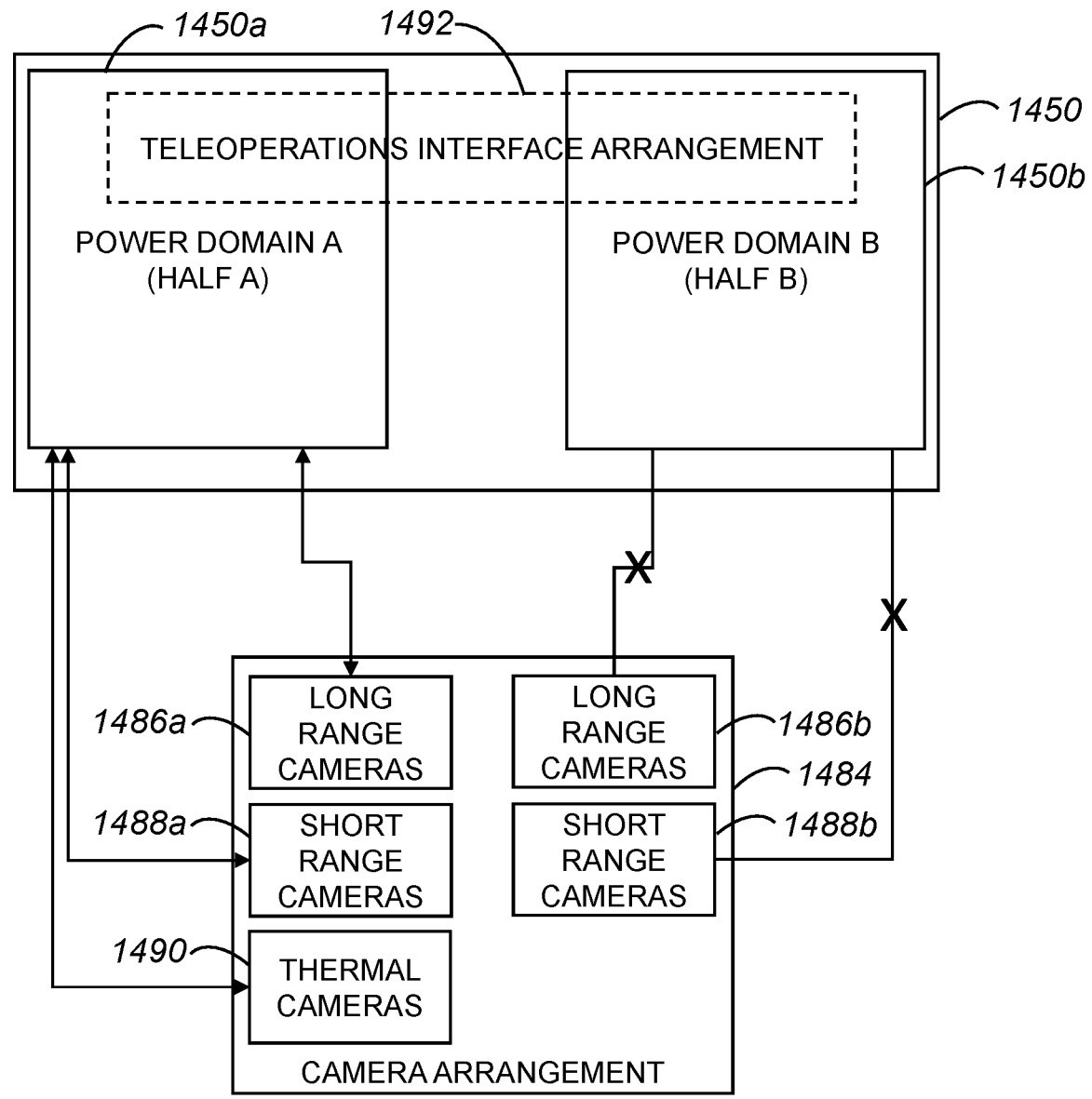
FIG. 14B is a block diagram representation of an aggregator/compute arrangement, e.g., aggregator/compute arrangement 1150 of FIG. 14A, at a time t2 when one portion is not functioning as expected in accordance with an embodiment.

In the described embodiment, at a time t2, half 1450b may be non-functional. For example, the performance of components associated with half 1450b may be degraded. FIG. 14B is a block diagram representation of aggregator/compute arrangement 1450 at a time t2 when half 1450b is not functioning as expected in accordance with an embodiment. At a time t2, half 1450b is no longer able to consistently control and/or obtain data from long range cameras 1486b and short range cameras 1488b, as indicated. Accordingly, teleoperations interface arrangement 1492 is supported by half 1450a, and is not supported by half 1450b at time t2.

At time t2, teleoperations interface arrangement 1492 controls and obtains data from long range cameras 1486a and short range cameras 1488a. Data from long range cameras 1486a and short range cameras 1488a may be processed by teleoperations interface arrangement 1492 to effectively enable teleoperations interface arrangement 1492 to provide a substantially full view of the surroundings of a vehicle to a teleoperations system.

Figure 15A:
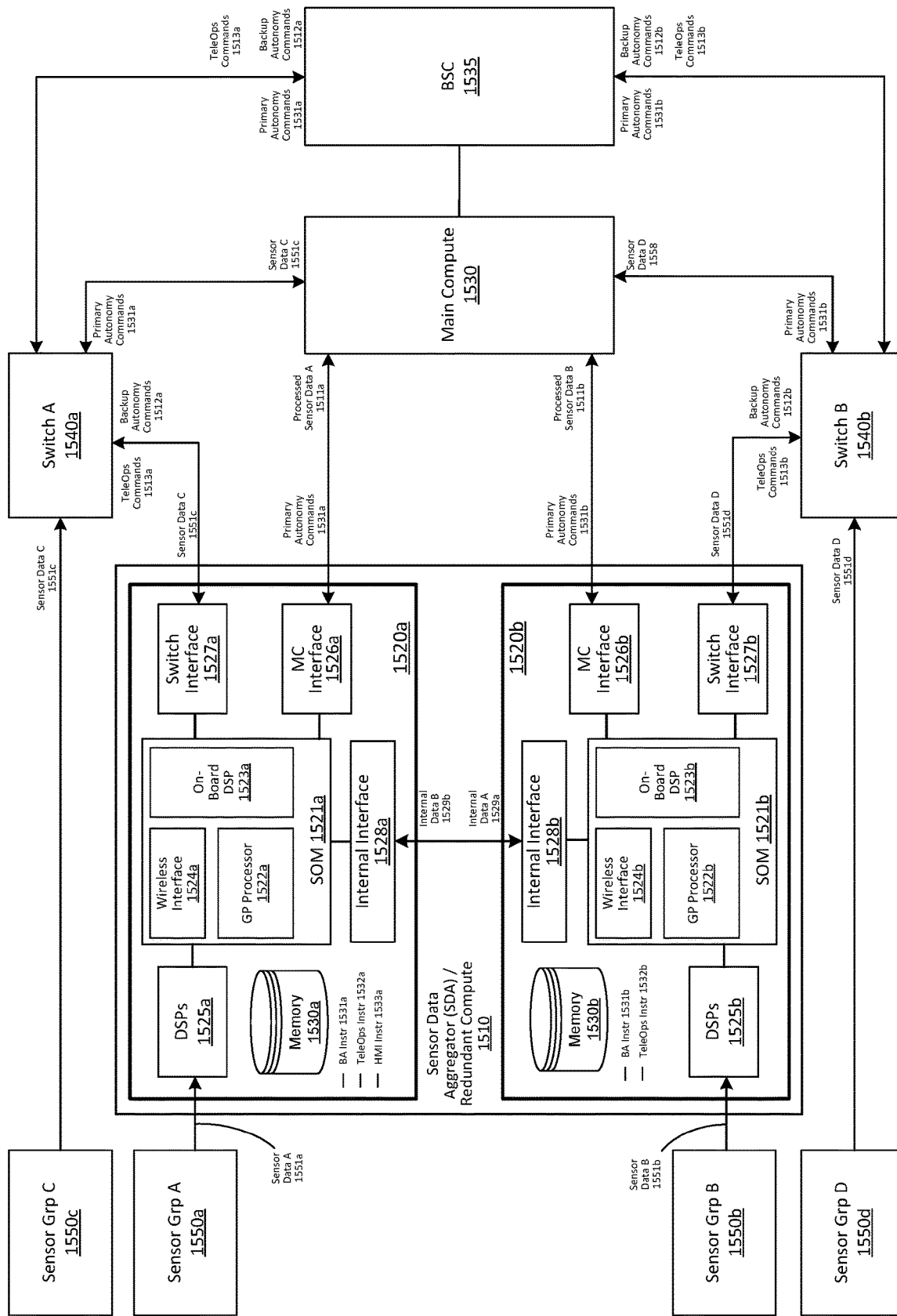
FIG. 15A is a block diagram representation of a sensor data aggregator/redundant compute and various other components of an autonomous vehicle, in accordance with an embodiment.

FIG. 15A is a block diagram representation of a sensor data aggregator/redundant compute and various other components of an autonomous vehicle, in accordance with an embodiment. The elements illustrated in FIG. 15A may be examples or embodiments of features illustrated in and described with respect to other figures herein. For instance, sensor data aggregator/redundant compute 1510 may be an example of an aggregator/compute arrangement, such as aggregator/compute arrangement 450 illustrated in FIG. 4. As another example, main compute 1530 may be an embodiment of a computing system, such as main compute 442 of FIG. 4, and brain stem computer 1535 may be an example of a brain stem computer, such as BSC 446 of FIG. 4.

In an embodiment, a vehicle capable of operating autonomously or semi-autonomously (e.g., vehicle 101' of FIG. 4) may include a sensor data aggregator/redundant compute 1510 (referred to herein as "sensor data aggregator" or SDA). The vehicle may further include a main compute 1530 and a BSC 1535. The main compute 1530 may correspond to, for example, main compute 442 of FIG. 4 and may implement a set of primary autonomy functionalities, such as primary autonomy arrangement 542a of FIG. 5. For instance, the main compute 1530 may generate a set of primary autonomy commands and/or trajectories to control and operate the vehicle in an autonomous or semi-autonomous manner based on information such as sensor data generated by the sensors of the vehicle, map data, traffic data, etc. The primary autonomy commands and/or trajectories generated by the main compute 1530 (e.g., primary autonomy commands 1531a and/or 1531b) may be forwarded to the BSC 1535 which controls, for example, the drivetrain motor, the brakes, and steering to cause the vehicle to move in accordance with the primary autonomy commands and/or trajectories.

The vehicle may include a plurality of sensors to enable the operate autonomous or semi-autonomous operations. These sensors are depicted in FIGS. 15A through 15E as sensors groups for simplicity and ease of illustration. Each of the sensor groups may include any number or combination of sensors including but not limited to including, for example, short-range cameras, long-range cameras, thermal imaging sensors/cameras, night vision cameras, LiDARs, radars, ultrasonic sensors, microphones, etc.

According to embodiments, the SDA 1510 may be configured to process and aggregate sensor data generated by sensor groups A 1550a and B 1550b and forward the processed sensor data (processed sensor data A 1511a and B 1511b) to the main compute 1530. The main compute 1530 may generate primary autonomy commands 1531a and/or 1531b (e.g., by way of primary autonomy arrangement 542a of FIG. 5) to control the vehicle based on the processed sensor data A 1511a and/or processed sensor data B 1511b. The vehicle may further include senor group C 1555 and sensor group D 1557. These groups of sensors may be configured to transmit sensor data (sensor data C 1551c and sensor data D 1551d, respectively) to the SDA 1510 and the main compute 1530 via switch A 1540a and switch B 1540b, respectively. The main compute 1530 may generate primary autonomy commands 1531a and/or 1531b to control the vehicle based further on sensor data C 1551c and sensor data D 1551d. As illustrated in FIG. 15A, and contrast with sensor data from sensor groups A 1550a and B 1550b, the flow of sensor data from sensor groups C 1550c and D 1550d to the main compute 1530 does not pass through the SDA 1510. In other words, with respect to the main compute 1530, the SDA 1510 functions as a sensor data processor and aggregator for sensor groups A 1550a and B 1550b, but not for sensor groups B 1550c and D 1550d.

In some embodiments, sensor group A 1550a and sensor group B comprise cameras including short-range cameras, long-range cameras, thermal imaging sensors, etc. And the SDA 1510 is configured to process image data captured by the cameras and forwarding the processed image data (e.g., processed sensor data A 1511a and processed sensor data B 1511b) to the main compute 1530. In such implementations, the SDA 1510 may be referred to as a "cameragator." Sensor group C 1555 and sensor group D 1557 each may include one or more sensors such as LiDARs, radars, ultrasonic sensors, microphones, etc. In at least one embodiment, the cameragator/SDA 1510 may be configured to receive and process image data captured by all the cameras that are used by the vehicle 101' in implementing autonomy functionalities.

In addition to receiving, processing, aggregating, and forwarding sensor data from sensor groups A 1550a and B 1550b to the main compute 1530, the SDA 1510 may be further configured to implement a set of teleoperations functionalities (e.g., via teleoperations interface arrangement 750e of FIG. 7). For instance, the SDA 1510 may process and transmit, via one or more wireless communication interfaces, sensor data received from the at least some of the sensors (e.g., sensor group A 1550a and sensor group 1550b) to a teleoperations system and receive remote commands to operate the vehicle from the teleoperations system. Further still, the SDA 1510 may be configured to implement backup autonomy functionalities, such as a set of parallel autonomy functionalities (e.g., via parallel autonomy arrangement 750a of FIG. 7) and a set of failover autonomy functionalities (e.g., via failover autonomy arrangement 750b of FIG. 7). To implement the backup autonomy functionalities, the SDA 1510 may further receive additional sets of sensor data (e.g., from sensor group C 1555 and sensor group D 1557).

According to embodiments, the switches A 1540a and B 1540b may be unmanaged Ethernet data switches configured to forward data in accordance with a pre-defined data forwarding table. In addition to forwarding data from the sensor groups C 1550c and D 1550d to the SDA 1510 and the main compute 1530, the switches A 1540a and B 1540b may also be configured to forward vehicle control trajectories and/or commands generated by the SDA 1510 and the main compute 1530 to the BSC 1535. For instance, switch A 1540a may be configured to forward primary autonomy commands 1531a generated by the main compute 1530 and backup autonomy commands 1512a generated by the SDA 1510 to the BSC 1535. Similarly, switch B 1540b may be configured to forward primary autonomy commands 1531a generated by the mount main compute 1530 and backup autonomy commands 1512b generated by the SDA 1510 to the BSC 1535.

According to embodiments, the SDA 1510 may include multiple computing assemblies: a first computing assembly 1520a and a second computing assembly 1520b. As can be appreciated, although SDA 1510 is illustrated in FIG. 15A has having two computing assemblies, the SDA 1510 is not limited to having two computing assemblies. The computing assembly 1520a may correspond to a printed circuit board (PCB) having a plurality of components, such as one or more systems on a module (SOMs) or systems on a chip (SOCs) 1521a, a set of digital signal processors (DSPs) 1525a, a main compute interface 1526a, a switch interface 1527a, an internal SDA interface 1528a, and a memory resource 1530a. The computing assembly 1520b may also correspond to another PCB having a plurality of components, such as one or more SOMs 1521b, a set of digital signal processors (DSPs) 1525b, a main compute interface 1526b, a switch interface 1527b, an internal SDA interface 1528b, and a memory resource 1530b. In some embodiments, the computing assembly 1520b may be substantially identical to computing assembly 1520a in terms of hardware disposition (e.g., in terms of components, wiring and interconnect, I/O ports, etc.). Each of the two computing assemblies may also be interchangeably used in place of the other. In other words, the hardware (e.g., PCB and components thereon) of computing assembly 1520a may be configured to operate as computing assembly 1520b and vice versa. As discussed throughout this disclosure, the configuration of two substantially identical computing assemblies 1520a and 1520b reduces complexity of the design and cost of the SDA 1510 and the vehicle 101' and improves maintainability and single-fault redundancy of the vehicle 101'. In alternative implementations, the computing assemblies 1520a and 1520b may have different hardware configurations.

The features of computing assemblies A 1520a and B 1520b illustrated in FIG. 15A may correspond to the example features illustrated in FIG. 10. For example, the computing assemblies 1520a and 1520b may correspond to the halves 450a and 450b of FIG. 10. As another example, the DSPs 1525a and 1525b may correspond to ISP arrangements 1070a and 1070b, respectively. Furthermore, SOMs 1521a and 1521b may correspond to SOM A 1070a and SOM B 1070b. And the ports 1074a and 1074b of FIG. 10 may be seen in FIG. 15A as one or more of the internal interfaces 1528a and 1528b, switch interfaces 1527a and 1527b, and the main compute interfaces 1526a and 1526b. And according to embodiments, the computing assemblies 1520a and 1520b may be configured to include other elements not illustrated in FIG. 15A. For instance, the computing assemblies 1520a and 1520b may include components to, for example, control the sensors of the sensor groups A 1550a and B 1550b.

The switch interfaces 1526a and 1526b may be interfaces to communicate with switches A 1540a and B 1540b. In one embodiment, the switch interfaces 1526a and 1526b are Ethernet interfaces. However, any other suitable type of data communication interface/protocol may be used. In certain embodiments, the computing assemblies 1520a and 1520b each includes a main compute interface 1526a and 1526b, respectively. The main compute interface 1526a may enable a direct communication link (e.g., not via a switch such as Switch A 1540a) between computing assembly 1520a and the main compute 1530 for, for example, transmitting processed sensor data A 1511a to the main compute 1530. Similarly, the main compute interface 1526b may enable a direct communication link (e.g., not via a switch such as Switch B 1540b) between computing assembly 1520b and the main compute 1530 for, for example, transmitting processed sensor data B 1511b to the main compute 1530. The internal interfaces 1528a and 1528b may be used by the computing assemblies 1520a and 1520b to exchange data between the computing assemblies. Although switch interface 1527a, main compute interface 1526a, and internal interface 1528a of computing assembly 1520a are illustrated in FIG. 15A as separate interfaces, it is understood that the computing assembly 1520a may communicate with two or more of switch A 1540a, main compute 1530, and computing assembly 1520b using the same communication interface. For instance, a single Ethernet interface may be used to communicate with two or more of the aforementioned components of the vehicle.

The SOM 1521a and 1521b of the computing assemblies 1520a and 1520b may respectively include general-purpose processors 1522a and 1522b, an on-board or integrated digital signal processors 1523a and 1523b, and wireless interfaces 1524a and 1524b. And as can be appreciated, although illustrated in FIG. 15A as each having a single SOM, the computing assemblies 1520a and 1520b may each include multiple SOMs. In some embodiments, the SOMs 1521a and 1521b may be implemented using off-the-shelf SOCs designed for mobile applications (e.g., mobile phone or tablet computer SOCs). The use of off-the-self SOCs as SOMs 1521a and 1521b may decrease overall system cost and improve upgradeability.

As illustrated in the example of FIG. 15A, the first computing assembly 1520a may be configured to receive sensor data A 1551a from the sensor group A 1550a, process the received sensor data A 1551a, and forward the processed sensor data A 1511a to the main compute 1530. Similarly, the second computing assembly 1520b may be configured to receive sensor data B 1551b from the sensor group B 1550b, process the received sensor data B 1551b, and forward the processed sensor data A 1511b to the main compute 1530. In certain embodiments, the computing assembly 1520a processes sensor data A 1551a using DSPs 1525a to generate processed sensor data A 1511a. Similarly, DSPs 1525b of the computing assembly 1520b may process sensor data B 1551b generated by sensor group B 1550b. In these embodiments, the on-board or integrated DSPs 1523a and 1523b (e.g., integrated graphics processing units) of SOMs 1521a and 1521b may be bypassed in the data processing flow. In other embodiments, the sensor data processing may be performed by the on-board DSPs 1523a and 1523b. In such implementations, the computing assemblies 1520a and 1520b may be implemented without the DSPs 1525a and 1525b. In yet additional embodiments, the combination of DSPs 1525a and on-board DSP 1523a may process sensor data A 1551a and the combination of DSPS 1525b and on-board DSP 1523b may process sensor data B 1551b.

In some embodiments, the sensor data A 1551a comprises image data captured by cameras in the sensor group A 1551. The DSPs 1525a may be configured to process the image data by performing operations such as down sampling, filtering, compressing, encoding, and the like to generate processed sensor data A 1511a. Similarly, the DSPs 1525b may perform similar functions to generate processed sensor data B 1511b. Additional details regarding the processing of sensor data A 1551a and B 1551b by the first and second computing assemblies 1551b are described with respect to FIG. 16.

The wireless interfaces 1524a and 1524b may be integrated cellular modems on the SOMs 1521a and 1521b. The SDA 1510 may include cellular antennas for coupling with the wireless interfaces 1524a and 1524b to enable the SDA 1510 to communicate over one or more cellular networks. The wireless interfaces 1524a and 1524b may, for example, communicate with one or more teleoperations systems to enable a remote operator to view sensor data (e.g., processed image data) and control the vehicle.

The general-purpose processors 1522a and 1522b may execute instructions stored in respective memories 1530a and 1530b of the computing assemblies. For instance, the general-purpose processor 1522a of SOM 1520a may execute a set of backup autonomy instructions 1532a to implement a set of backup autonomy functionalities. And processor 1522b may execute instructions backup autonomy instructions 1532b. In certain implementations, general-purpose processor 1522a may actively perform backup autonomy functionalities while general-purpose processor 1522b may standby with respect to the backup autonomy functionalities, or vice versa. According to embodiments, the backup autonomy functionalities may include parallel autonomy functionalities, which may be performed concurrently with the main compute 1530 implementing the primary autonomy functionalities. In certain implementations, the parallel autonomy functionalities may be implemented based on data generated by at least some of the sensors that are used in the implementation of primary autonomy functionalities, such as LiDARs, radars, and one or more thermal imagine cameras. The parallel autonomy functionalities may, independently from the primary autonomy functionalities, determine whether the vehicle is likely to encounter unsafe conditions (e.g., a collision, veering off the road, etc.). In some examples, inputs used to implement parallel autonomy may include primary autonomy commands or trajectories generated by primary autonomy. The parallel autonomy functionalities may override primary autonomy vehicle controls if parallel autonomy determines that, for example, a collision is likely. According to embodiments, the backup autonomy functionalities may also include failover autonomy functionalities, which may be implemented in response to detection of a fault associated with the implementation of primary autonomy functionalities and/or teleoperations functionalities. For instance, hardware faults such as failure of main compute 1530, switches A 1540*a* or B 1540*b*, or one or more sensors that cause primary autonomy to fail or degrade the performance of primary autonomy, may trigger the implementation of failover autonomy functionalities. Software or algorithmic faults in implementing primary autonomy functionalities may also trigger the implementation of failover autonomy functionalities. Once triggered, failover autonomy may take over control of the vehicle from primary autonomy or teleoperations to bring the vehicle to a safe stop (e.g., in view of the vehicle's current speed, trajectory, and surroundings).

According to one embodiment, a first one of the computing assemblies 1520*a* and 1520*b* may actively implement the backup autonomy functionalities and the second of the computing assemblies may be in standby with respect to backup autonomy. In response to a detection of a fault (e.g., failure of the computing assembly actively implementing backup autonomy, failure of a switch such as switch A 1540*a*, etc.), the second of the computing assemblies may be triggered to actively implement backup autonomy functionalities.

The general-purpose processors 1522*a* and 1522*b* may further execute teleoperations instructions 1522*a* and 1532*b*, respectively, to implement teleoperations functionalities to enable a remote operator to operate the vehicle. For instance, sensor data may be transmitted via one or more of the wireless interfaces 1524*a* and 1524*b* to a teleoperations system to enable the display of one or more video feeds of the surroundings of the vehicle captured by the vehicle's cameras to be displayed on a computing device of the remote operator. Remote control input of the operator may be received by the wireless interfaces 1524*a* and 1524*b* and processed by SDA 1510. Vehicle commands that are generated based on the remote control input may be transmitted by the SDA 1510 to the BSC 1535 as teleoperations commands 1531*a* and 1531*b* via switch A 1540*a* and 1540*b*, respectively. The computing assembly 1520*a* may be further configured to execute a set of HMI instructions 1533*a* to implement functionalities relating to a human-machine interface.

Figure 15B:
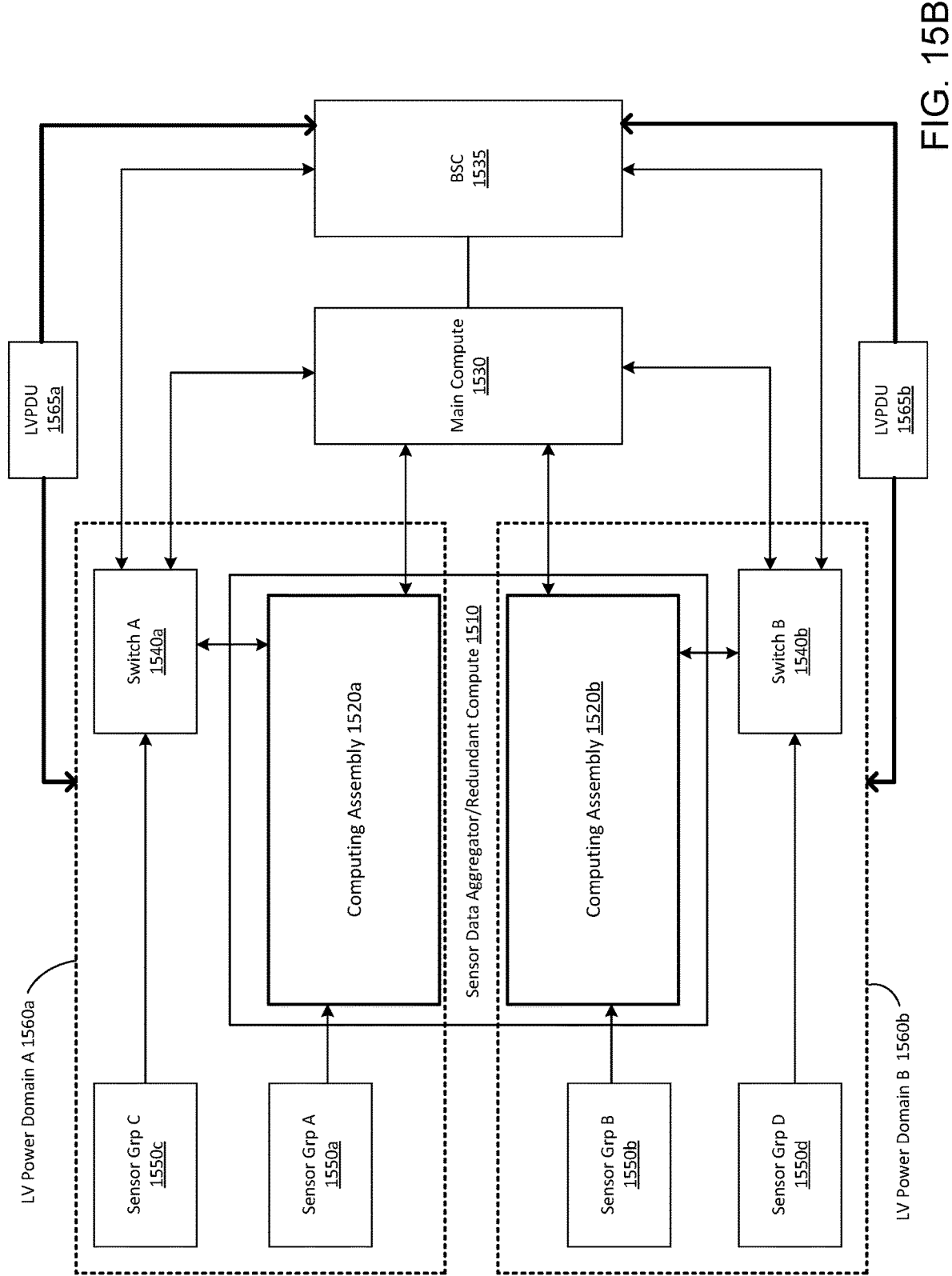
FIG. 15B is another block diagram representation of a sensor data aggregator/redundant compute and various other components of an autonomous vehicle with respect to multiple power domains of the vehicle, in accordance with an embodiment.

FIG. 15B is another block diagram representation of a sensor data aggregator/redundant compute and various other components of an autonomous vehicle with respect to multiple power domains of the vehicle, in accordance with an embodiment. In the below description of FIG. 15B, references may be made to earlier figures, particularly FIG. 15A. For instance, at least some of the components illustrated in FIG. 15B are also illustrated in and described with respect to FIG. 15A.

In accordance with embodiments, the autonomous vehicle comprises multiple power domains, including at least one high voltage power domain and multiple low voltage power domains. As used herein, "low voltage" may refer to a wide range of voltages. In certain implementations, low voltage may be any voltage that is less than 50 volts (e.g., 12V, 48V, etc.). The terms "low voltage" and "high voltage" may also simply refer to voltage ranges relative to each other (e.g., low voltage may refer to any voltage in the 0V to 60V voltage range while high voltage may refer to any voltage above 60V). Furthermore, a power domain may refer to a collection of components that are powered by the same power supply. In the context of a low voltage power domain, the collection of components within the low voltage power domain may each receive power from the same low voltage power distribution unit (LVPDU).

The vehicle may include a high voltage power source, such as a high voltage battery, for powering the vehicle. The high voltage power supplied by the high voltage power source may be converted or down-stepped to a low voltage source using one or more DC-DC converters. An LVPDU, such as LVPDUs 1565*a* and 1565*b*, may be configured to receive low voltage power from the one or more DC-DC converters to supply low voltage power to various components of the vehicle that require low voltage power. Among other functionalities, LVDPUs 1565*a* and 1565*b* may be configured to regulate the low voltage power within their respective power domains, detect power error conditions, faults, or failures (e.g., a short circuit, voltage irregularities, etc.), and isolate the detected power error conditions or failures to prevent wider outages of autonomous vehicle system components. In addition, the vehicle may further include one or more low voltage backup batteries to supply low voltage power to the LVPDUs 1565*a* and 1565*b*, and their respective low voltage power domains, in the event of a failure of the DC-DC converters and/or of the high voltage power source. Each of the multiple low voltage power domains may be powered independently via a corresponding low voltage power distribution unit (LVPDU).

A sensor data aggregator/redundant compute such as SDA 1510 may be split between two low voltage power domains. In particular, the computing assemblies 1520*a* and 1520*b* of SDA 1510 may receive power from separate low voltage power domains. In the example illustrated in FIG. 15B, LVPDU 1565*a* may supply low voltage power to low voltage power domain A 1560*a*, which may comprise sensor group A 1550*a*, sensor group C 1550*c*, computing assembly 1520*a*, and switch A 1540*a*. And LVPDU 1565*b* may supply low voltage power to low voltage power domain A 1560*b*, which may comprise sensor group B 1550*b*, sensor group D 1550*d*, computing assembly 1520*b*, and switch B 1540*b*.

In one embodiment, the BSC 1535 may be configured to receive low voltage power from either or both LVPDU 1565*a* and 1565*b*. For instance, the BSC 1535 may selectively receive low voltage power from LVDPU 1565*a* or from LVDPU 1565*b* based on the power conditions of the low voltage power domains A 1560*a* and B 1560*b*. In this manner, the BSC 1535 may remain operational even if one of the LVDPUs fails. Furthermore, the main compute 1530 may be configured to receive power from a power source other than the LVPDUs 1565*a* and 1565*b*. In an implementation, the main compute 1530 may be powered by high voltage power supplied by a high voltage power domain.

Figure 17A:
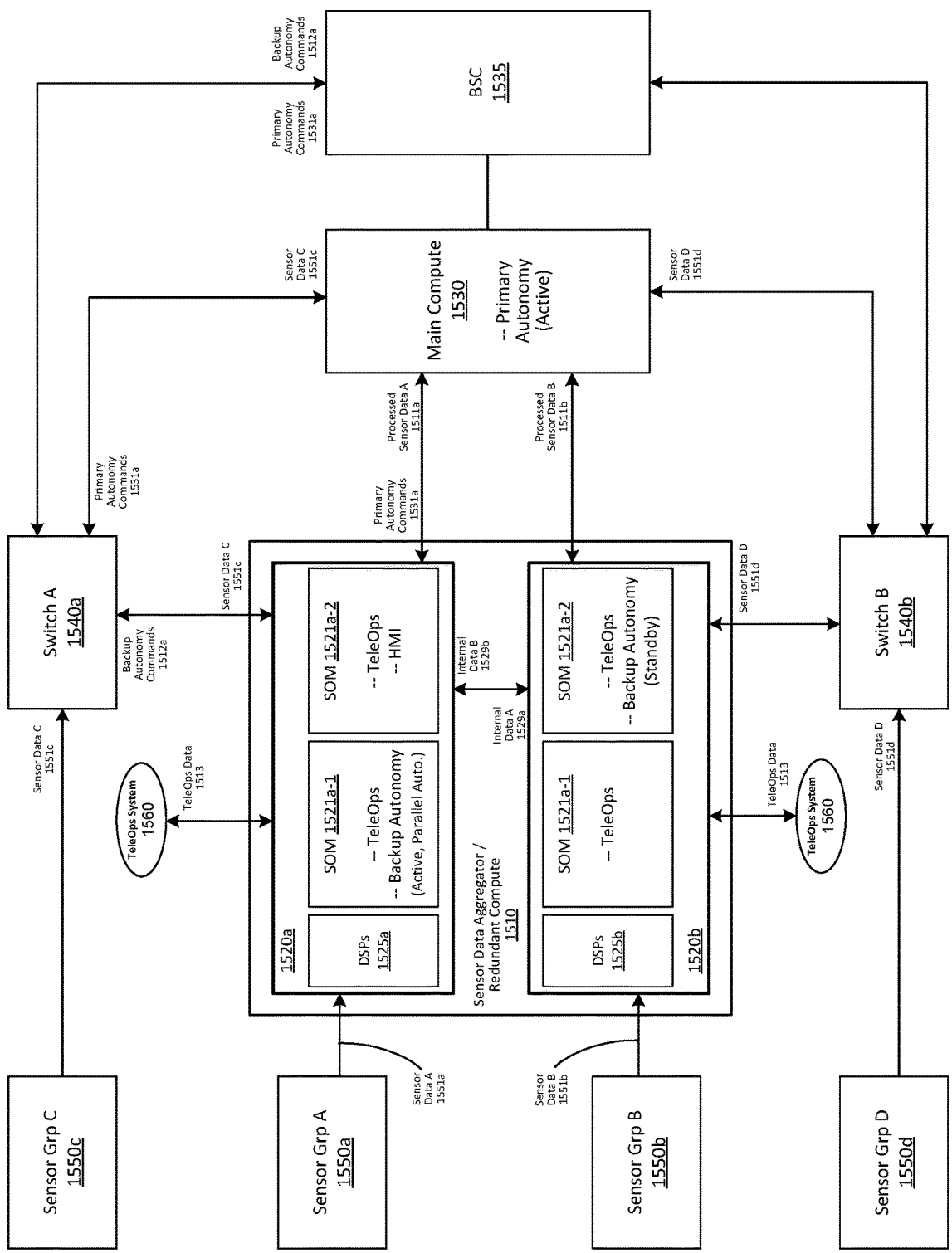
FIG. 17A is a block representation of a sensor data aggregator/redundant compute and various other components of an autonomous vehicle operating in an autonomous mode under normal operating conditions of the vehicle, in accordance with an embodiment.
Figure 17B:
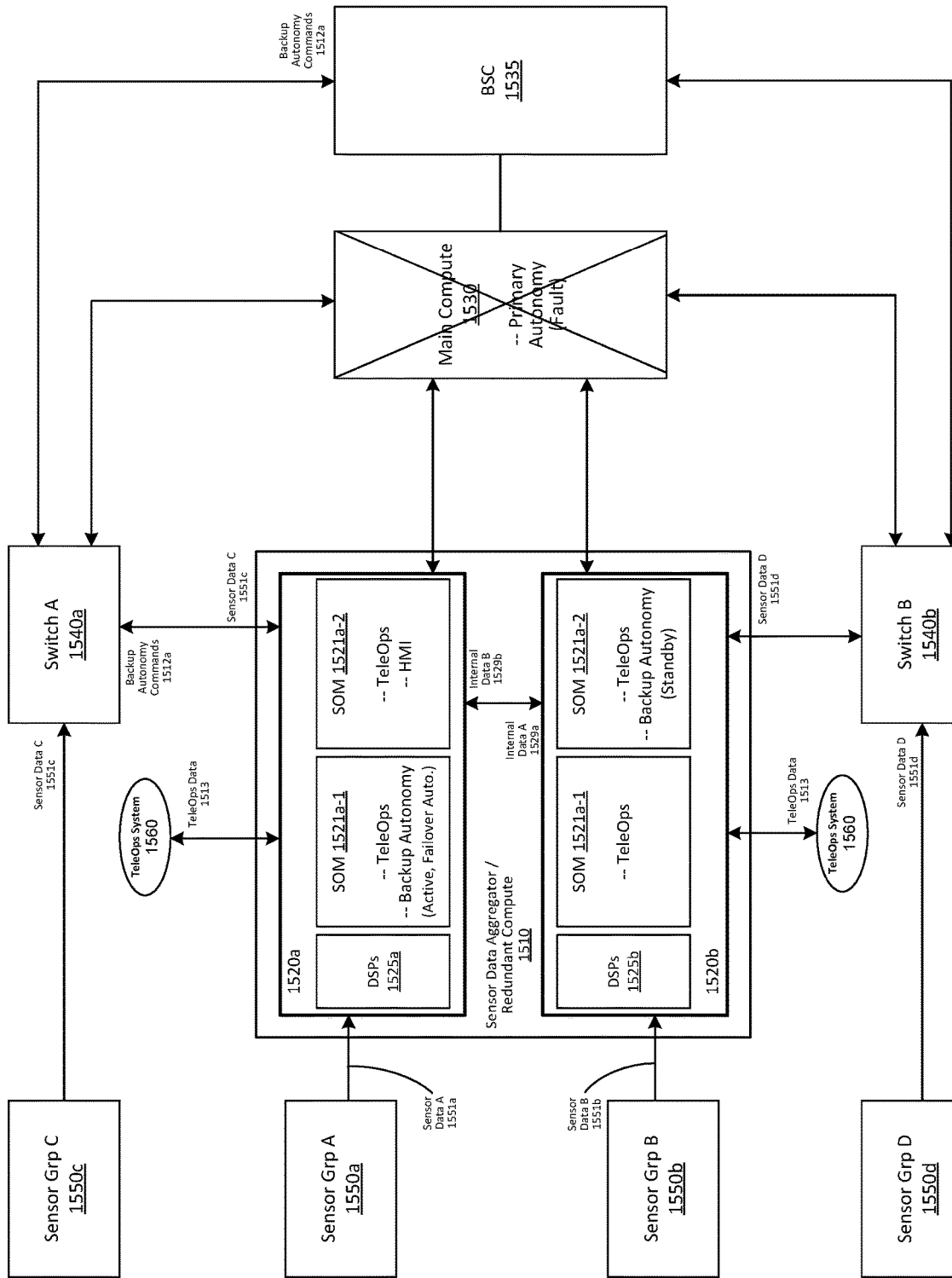
FIG. 17B is another block representation of a sensor data aggregator/redundant compute and various other components of an autonomous vehicle operating under a first fault/failure condition, in accordance with an embodiment.
Figure 17C:
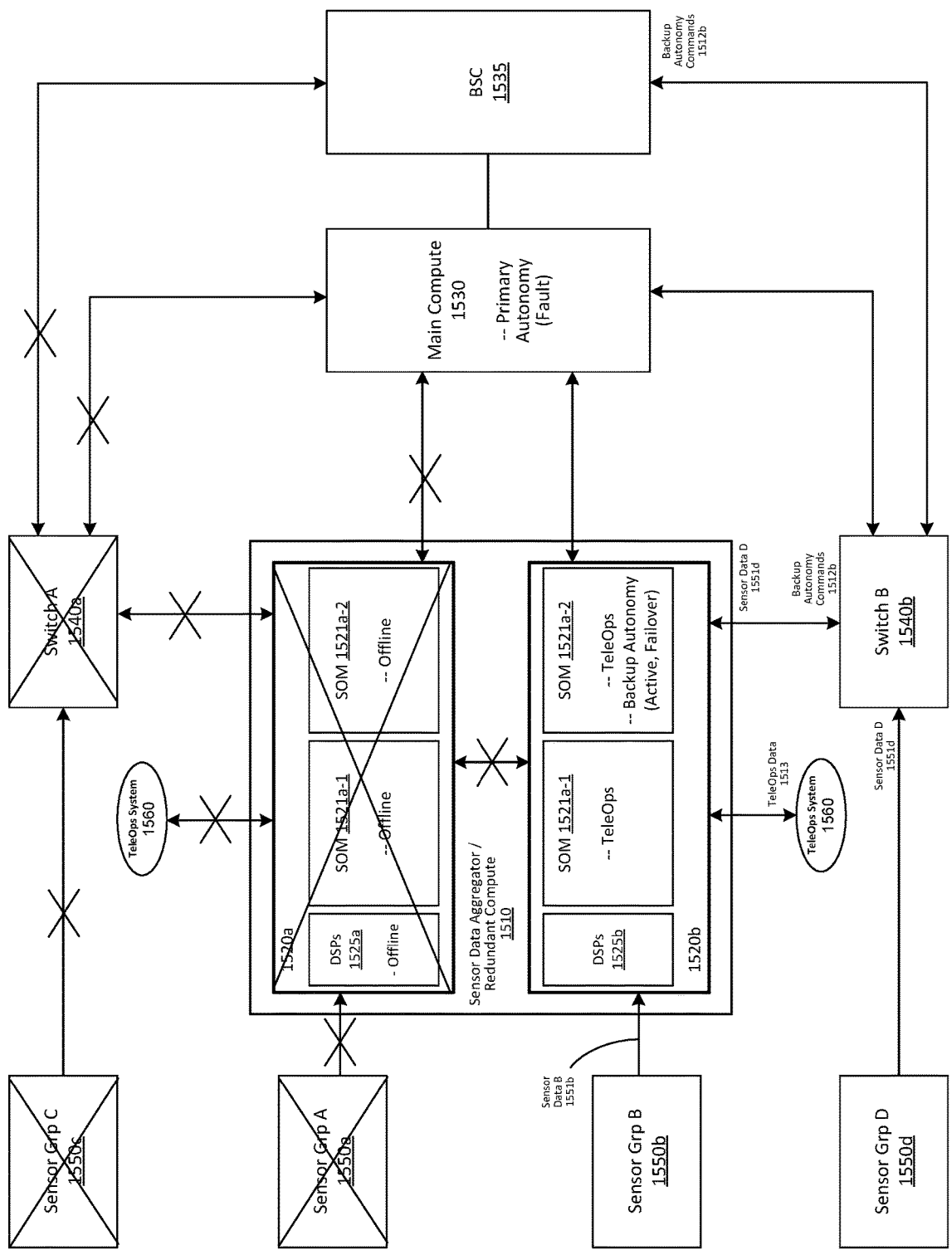
FIG. 17C is another block representation of a sensor data aggregator/redundant compute and various other components of an autonomous vehicle operating under a second fault/failure condition, in accordance with an embodiment.

As discussed in further detail in FIG. 17C, configurations of the SDA 1510 and other vehicle components such as the one illustrated in FIG. 15B enable the vehicle to be resilient to single point failures in its power system.

Figure 16:
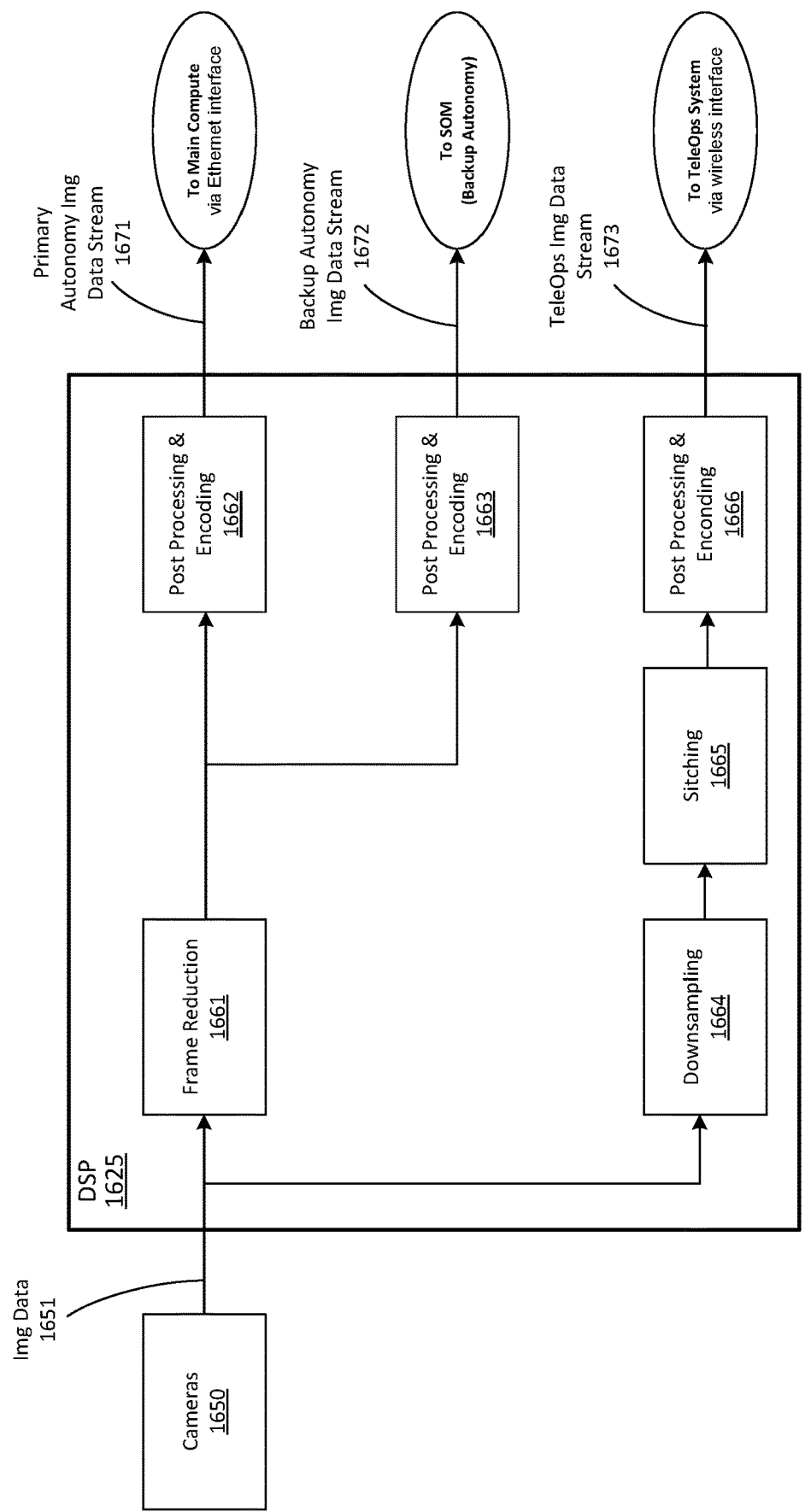
FIG. 16 is a functional block diagram illustrating an example of sensor data processing flow in digital signal processors processing sensor data of a sensor data aggregator/redundant compute, in accordance with an embodiment.

FIG. 16 is a functional block diagram illustrating an example of sensor data processing flow in digital signal processors processing sensor data of a sensor data aggregator/redundant compute, in accordance with an embodiment. The example DSP 1625 illustrated in FIG. 16 may be any digital signal processor or image signal processor that processes sensor data within the sensor data aggregator/redundant compute such as SDA 1510 of FIG. 15A. For instance, the DSP 1625 may correspond to any of DSPs 1525*a* or 1526*b* of FIG. 15A or on-board or integrated DSPs 1523*a* or 1523*b* of FIG. 15A.

As illustrated in FIG. 16, DSP 1625 receives image data 1651 from cameras 1650. The cameras 1650 may include long-range cameras, short-range cameras, wide-view or wide-angle cameras, low light cameras, infrared or thermal cameras, and the like. In the context of FIG. 15A, the cameras 1650 may belong to any one of sensor group A 1550a or sensor group B 1550b. And although FIG. 16 illustrates DSP 1625 as receiving image data 1651 from cameras 1650, it is understood that DSP 1625 may be configured to process sensor data from any type of sensor or any combination of types of sensors. The cameras 1650 may be configured to continuously capture image frames (e.g., at any frame rate such as 30 or 60 frames per second) and the image data 1651 may be a continuous stream of image frames captured by the cameras 1650. Furthermore, the image output data streams may differ in terms of the cameras used. For instance, in one embodiment, the primary autonomy data stream 1671 may include all of the cameras processed by DSP 1625 whereas the backup autonomy image data stream 1672 may include just data captured by one of the cameras (e.g., an infrared camera).

DSP 1625 may represent any number of digital or image signal processors. DSP 1625 may be a single physical digital signal processor capable of processing all of the streams of image data captured by the cameras 1650. DSP 1625 may also represent a plurality of digital signal processors. In one embodiment, each camera of cameras 1650 transmits image data to a corresponding digital signal processor of DSP 1625. In other words, an equal number of digital signal processors is provided in DSP 1625 as the number of cameras in cameras 1650.

DSP 1625 may be configured to process the image data 1651 and output multiple image data streams. For instance, a primary autonomy image data stream 1671 may be generated by DSP 1625 for implementing primary autonomy functionalities of the vehicle. The primary autonomy image data stream 1671 may be transmitted to main computer 1530 via, for example, main computer interface 1526a or 1526b of FIG. 15A. In one embodiment, the main computer interface may be an Ethernet interface. A backup autonomy image data stream 1672 may be generated by DSP 1625 for use by the SDA 1510 to implement backup autonomy functionalities (e.g., parallel autonomy and/or failover autonomy) of the vehicle. The backup autonomy image data stream 1672 may be output to one or more processor(s), SOMs, or SOCs on-board the sensor data aggregator/redundant compute that are configured to implement the backup autonomy functionalities. In one example, referring ahead to FIG. 17A, the backup autonomy image data stream 1672 may be forwarded to SOM 1521a-1, which is actively implementing backup autonomy functionalities in the context of FIG. 17A. As described herein, the SDA 1510 may selectively transition the implementation of backup autonomy (e.g., parallel and/or failover autonomy) from one computing assembly of the SDA 1510 (e.g., 1520a) to another computing assembly of the SDA 1510 (e.g., 1520b). In response to such a transition, the backup autonomy image data stream 1672 may be re-routed to the appropriate processor within the SDA 1510 (e.g., to SOM 1521a-2). Alternatively, the backup autonomy image data stream 1672 may be concurrently output to each of the processors configured to implement backup autonomy functionalities (e.g., both actively implementing backup autonomy and in standby mode, such as both SOM 1521a-1 and SOM 1521b-2). A teleoperations image data stream 1673 may be generated by DSP 1625 for transmission to a teleoperations system to enable the display of a video feed of the surroundings of the vehicle on a computing device of a remote operator. In addition, the DSP 1625 may generate a security image data stream (not depicted in FIG. 17A) as a logging or security feature to record security events such as unauthorized intrusions, collisions or impact, etc. The security image data stream may be locally stored on a data storage device on the vehicle and/or transmitted via a wireless data link to be stored by a central server.

Each of the output data streams of the DSP 1625 may have different requirements in terms of frame rate, resolution, field of view, encoding, etc. As an example, primary and backup autonomy functionalities may require around 10 fps in frame rate, whereas for a usable video feed for display for teleoperations, 30 fps may be required. As another example, the teleoperations video feed may require images of a lower resolution than required by the primary and backup autonomy and thus it could be advantageous to reduce the resolution of the teleoperations image data stream 1673 to more efficiently allocate network bandwidth and maintain system stability. Accordingly, the DSP 1625 may include separate data processing pipelines for processing the image data 1551 from the cameras 1550 to generate output data streams.

To generate the primary autonomy image data stream 1671 and backup autonomy image data stream 1672, image data 1651 may go through frame reduction 1661 to reduce the frame rate to one that is required by primary and backup autonomy. In the embodiment illustrated in FIG. 16, the frame rate required for primary autonomy and backup autonomy is the same and the two data processing pipelines may share the same processing provided by frame reduction 1661. As an example, the frame reduction 1661 may reduce the frame rate from 30 or 60 fps (e.g., frame rate of the input image data 1651) to 10 fps for use by the primary and backup autonomy arrangements. Post processing and encoding 1662 and 1663 may be performed for the primary autonomy data stream 1671 and backup autonomy image data stream 1672, respectively. For instance, contrast, exposure, noise, and the like of the images in the data stream may all be adjusted based on the requirements of primary and backup autonomy.

To generate the teleoperations image data streams 1673, image data 1651 may be downsampled (e.g., reducing resolution) at 1664. Images from multiple cameras may also be stitched at 1665 to obtain larger images having wider field of view. As an alternative, the stitching may be performed off-vehicle by the teleoperations system. Post processing and encoding 1666 that is specifically tailored for teleoperations may also be performed.

FIG. 17A is a block representation of a sensor data aggregator/redundant compute and various other components of an autonomous vehicle operating in an autonomous mode under normal operating conditions of the vehicle, in accordance with an embodiment. In the below description of FIG. 17A, references may be made to earlier figures, particularly FIG. 15A. For instance, at least some of the components illustrated in FIG. 17A are also illustrated in and described with respect to FIG. 15A. In the context of FIG. 17A, "an autonomous mode under normal operating conditions of the vehicle" may refer to a primary autonomy arrangement being active (e.g., implemented by main compute 1530) to control the vehicle and when no hardware, software, or algorithmic faults are being experienced by components illustrated in FIG. 17A.

In the example illustrated in FIG. 17A, computing assemblies 1520a and 1520b may each include two SOMs—computing assembly 1520a may include SOMs 1521a-1 and 1521a-2 and computing assembly 1520b may include SOMs 1521b-1 and 1521b-2. The SOMs of the SDA 1510, such as 1521a-1, 1521a-2, 1521b-1, and 1521b-1, may each execute respective instructions to each perform a respective set of functionalities related to one or more of backup autonomy (e.g., parallel and/or failover autonomy), teleoperations, and human-machine interfacing.

As illustrated in FIG. 17A, under normal operating conditions, the SDA 1510 may process sensor data (sensor data A 1551a and B 1551b) generated by sensor groups A 1550a and B 1550b. The processed sensor data A 1551a and 1551b may be forwarded to the main compute 1530 to enable the main compute 1530 to implement the primary autonomy functionalities to control the vehicle autonomously. The main compute 1530 further receives sensor data C 1551c and D 1551d generated by sensor groups C 1550c and D 1550d, respectively, via switches A 1540a and 1540b, respectively, to implement the primary autonomy functionalities. The vehicle trajectory and/or commands generated by the main compute 1530 may be forward to the BSC 1535 via switch A 1540a as primary autonomy commands 1531a. Alternatively, these commands may be transmitted from the main compute 1530 to the BSC 1535 via switch B 1540b (e.g., as primary autonomy commands 1531b of FIG. 15A). As discussed herein, the main compute 1530 may be communicatively coupled to the BSC 1535 via both switch A 1540a and switch B 1540b and may selectively transmit the vehicle commands via one of the switches based on the real-time statuses (e.g., data latency, throughput, health, etc.) of the switches. As another alternative, the main compute 1530 may transmit vehicle trajectory and/or commands to the BSC 1535 via both of the switches A 1540a and B 1540b contemporaneously.

According to embodiments, with respect to the backup autonomy functionalities, the SOMs of SDA 1510 may be configured such that one SOM of a first of the two computing assemblies of the SDA 1510 actively implements the set of backup autonomy functionalities while one SOM of the second of the two computing assemblies is in a standby mode with respect to backup autonomy. As discussed herein, backup autonomy functionalities may refer to parallel autonomy functionalities (e.g., implemented as parallel autonomy arrangement 750a of FIG. 7) and failover autonomy functionalities (e.g., implemented as failover autonomy arrangement 750b of FIG. 7). In particular, the parallel autonomy functionalities may be implemented concurrently with the primary autonomy functionalities while the failover autonomy functionalities are implemented in response to detection of a fault associated with the set of primary autonomy functionalities. In the example illustrated in FIG. 17A, SOM 1521a-1 of computing assembly 1520a actively implements backup autonomy functionalities while SOM 1521b-2 of computing assembly 1520b is in a standby mode with respect to backup autonomy. Since in FIG. 17A, no fault is detected or experienced with respect to primary autonomy, the backup autonomy functionalities implemented by SOM 1521a-1 may correspond to parallel autonomy functionalities (e.g., under normal operating conditions illustrated in FIG. 17A, failover autonomy is not triggered). SOM 1521a-2, by being in a standby mode with respect to backup autonomy, may be triggered to implement backup autonomy functionalities (e.g., parallel autonomy and/or failover autonomy) in response to a fault with the implementation of backup autonomy functionalities by SOM 1521a-1. An example of this is discussed with respect to FIG. 17C.

The backup autonomy functionalities may be implemented by SOM 1521a-1 based sensor data generated by at least a subset of the sensors of the vehicle. For example, and without limitation, parallel autonomy may be based on sensor data generated by at least one sensor in each of sensor groups A 1550a, C 1550c, and D 1550d. In such an example, computing assembly 1520b may process and/or forward at least a portion of the sensor data D 1551d required by the parallel autonomy to computing assembly 1520a as internal data B 1529b.

According to embodiments, SOMs 1521a-1, 1521a-2, 1521b-1, and 1521b-1 may, as a group, implement the set of teleoperations functionalities. For instance, each of SOMs may include a wireless interface (e.g., wireless interfaces 1524a and 1524b of FIG. 15A), which may be a cellular modem, for establishing wireless data links (e.g., a 4G/LTE/5G data connection). The wireless data links may be established through multiple wireless service providers to improve reliability of the data communications. In one configuration, SOMs 1521a-1, 1521a-2, 1521b-1, and 1521b-1 may each establish a respective wireless data link to transmit teleoperations data 1513 to the teleoperations system 1560. In another implementation, one of the SOMs may communicate with the teleoperations system 1560. As yet another alternative, the teleoperations functionalities may include intelligently switching between data links and/or determining to establish one or multiple wireless data links based on the current conditions (e.g., signal strength, SNR, data bandwidth, latency, etc. of each of the data links). The teleoperations data 1513 may include a data stream to enable the display of a video of the vehicle's surroundings by a computing device of a remote operator. The teleoperations data 1513 may further include data to enable the display of various vehicle information (e.g., speed, heading, state of charge, etc.) on the computing device of the operator.

According to an embodiment, SOM 1521a-2 may also execute instructions to implement a set of human-machine interface (HMI) functionalities. These functionalities may include presenting content on a display to enable users or customers to authenticate themselves and retrieve items from locked compartments of the vehicle.

FIG. 17B is another block representation of a sensor data aggregator/redundant compute and various other components of an autonomous vehicle operating under a first fault/failure condition, in accordance with an embodiment. For instance, the vehicle may transition from operating as illustrated in FIG. 17A (in autonomous mode under normal operating conditions) to operating as illustrated in FIG. 17B in response to a fault of the main compute 1530 implementing primary autonomy functionalities. The fault may be a hardware fault, a power fault, and/or a software/algorithmic fault.

In the conditions illustrated in FIG. 17B, the main compute 1530, due to the fault, does not generate vehicle trajectory and/or commands to the BSC 1535. In response to detecting the fault in the main compute 1530 in implementing primary autonomy functionalities, the SDA 1510 may be triggered to take over control of the vehicle by implementing failover autonomy functionalities. The failover autonomy functionalities may include operating the vehicle to bring it to a safe stop. In the example illustrated in FIG. 17B, SOM 1521a-1 may be triggered to transition from implementing parallel autonomy functionalities (as shown in, for example, FIG. 17A) to implementing failover autonomy functionalities in response to detection of the fault in the main compute 1530.

Similar to parallel autonomy, failover autonomy functionalities may be implemented by SOM 1521a-1 based sensor data generated by at least a subset of the sensors of the vehicle. For example, and without limitation, parallel autonomy may be based on sensor data generated by at least one sensor in each of sensor groups A 1550*a*, C 1550*c*, and D 1550*d*. In such an example, computing assembly 1520*b* may process and/or forward at least a portion of the sensor data D 1551*d* required by failover autonomy to computing assembly 1520*a* as internal data B 1529*b*. The vehicle trajectory and/or commands generated by failover autonomy to bring the vehicle to a safe stop may be generated by SOM 1521*a*-1 as backup autonomy commands 1512*a* and transmitted to the BSC 1535 via switch A 1540*a*.

FIG. 17C is another block representation of a sensor data aggregator/redundant compute and various other components of an autonomous vehicle operating under a second fault/failure condition, in accordance with an embodiment. For instance, the vehicle may transition from operating as illustrated in FIG. 17A (in autonomous mode under normal operating conditions) to operating as illustrated in FIG. 17C in response to a failure power failure in one of the vehicle's low voltage power domains (e.g., low voltage power domain A 1560*a* of FIG. 15B).

In the example illustrated in FIG. 17C, low voltage power domain A 1560*a*, which supplies low voltage power to sensor group A 1550*a*, sensor group C 1550*c*, computing assembly 1520*a* of SDA 1510, and switch A 1540*a*, may experience a power fault. The power fault may be caused by a failure of, for example, LVPDU 1565*a* of FIG. 15B and may cause each of the aforementioned components of the vehicle to go offline. As a result, the main compute 1530 is unable to receive data from sensor groups A 1550*a* and C 1550*c* and SOM 1521*a*-1 is unable to continue implementing backup autonomy.

In response to detecting the power fault of the low voltage power domain A 1560*a* (or similar faults that render the aforementioned components unsuitable for supporting vehicle operations), a number of remedial operations may be performed including, for example, triggering the active implementation of backup autonomy functionalities by SOM 1521*a*-2 (which previously may be in a standby mode with respect to backup autonomy, as illustrated in FIG. 17A). In one embodiment, because the main compute is unable to receive data from sensor groups A 1550*a* and C 1550*c*, the primary autonomy may fault. Accordingly, SOM 1521*a*-2 may implement failover autonomy to generate backup autonomy commands 1512*b* to control the vehicle to, for example, bring the vehicle to a safe stop. According to embodiments, sensor groups B 1550*b* and D 1550*d* may include sensors that provide a substantially 360-degree field of view surrounding the vehicle. Thus, even though sensor groups A 1550*a* and C 1550*c* are non-functional, failover autonomy may still be performed. Furthermore, the machine-learning models used by SOM 1521*a*-2 in implementing failover autonomy may be specifically tailored for this particular situation where only sensor groups B 1550*b* and D 1550*d* are available.

Figure 17D:
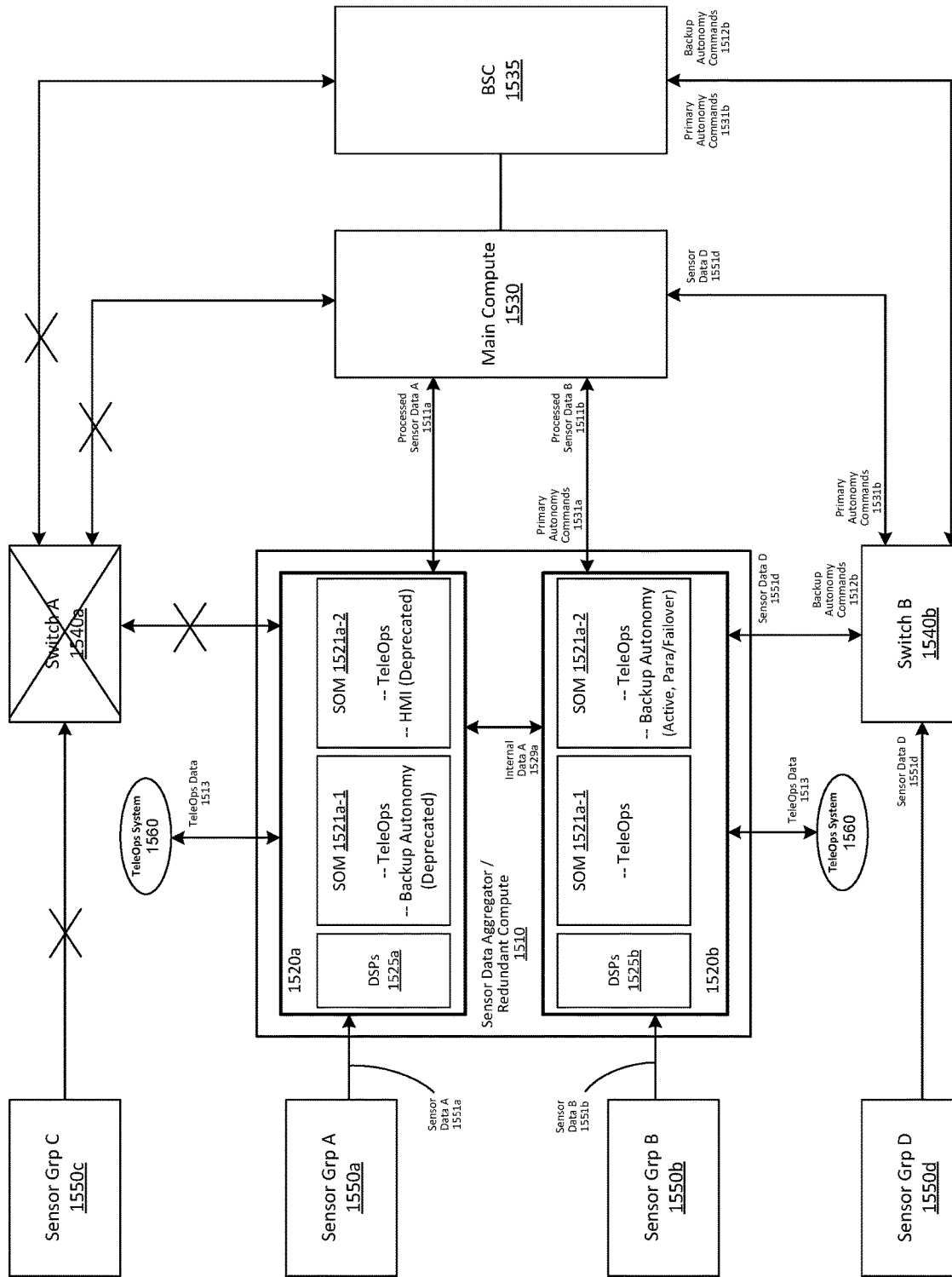
FIG. 17D is another block representation of a sensor data aggregator/redundant compute and various other components of an autonomous vehicle operating under a third fault/failure condition, in accordance with an embodiment.

FIG. 17D is another block representation of a sensor data aggregator/redundant compute and various other components of an autonomous vehicle operating under a third fault/failure condition, in accordance with an embodiment. For instance, the vehicle may transition from operating as illustrated in FIG. 17A (in autonomous mode under normal operating conditions) to operating as illustrated in FIG. 17D in response to a failure in a portion of the communication network (e.g., failure of switch A 1540*a*) within the vehicle.

In the example illustrated in FIG. 17D, switch A 1540*a* is under a fault condition and is unable to forward data between the SDA 1510 (computing assembly 1520*a*), the main compute 1530, BSC 1535, and sensor group C. In response to detecting this fault, the SDA 1510 and main compute 1530, among other components of the vehicle, may transition from operating as illustrated in FIG. 17A to operating as illustrated in FIG. 17D.

In one embodiment, in response to detecting a fault, SOM 1521*b*-2 of computing assembly 1520*b* (which previously may be in a standby mode with respect to backup autonomy, as illustrated in FIG. 17A) may be triggered to begin actively implement backup autonomy functionalities. As an alternative, SOM 1521*a*-1 may continue to function as the processor implementing backup autonomy and the backup vehicle commands may be routed via the internal data connection between computing assemblies 1520*a* and 1520*b* to be transmitted to the BSC 1535 via switch B 1540*b*.

In some examples, in response to detecting this fault, the main compute 1530 and the SDA 1510 may perform a handshake or a negotiation to determine which component will be in command of the vehicle. For instance, the primary autonomy functionalities may be severely deprecated due to the lack of sensor data from sensor group C 1550*c* and, as a result, SOM 1521*a*-2 (or SOM 1521*a*-1) may implement failover autonomy to bring the vehicle to a safe stop. In the alternative, if main compute 1530 determines that the sensor data received from the sensor groups A 1550*a*, B 1550*b*, and D 1550*d* are sufficient to continue operating primary autonomy, the main compute 1530 may retain control of the vehicle (e.g., to make a safe stop, to travel to a designated safe location nearby, to return to depot, etc.). In doing so, the main compute 1530 may be configured to re-route primary autonomy commands to be transmitted to the BSC 1535 via switch B 1540*b* as primary autonomy commands 1531*b*. In contrast, under normal operating conditions illustrated in FIG. 17A, the primary autonomy commands may be forwarded to the BSC 1535 via switch A 1540*a* as primary autonomy commands 1531*a*. As illustrated in FIG. 17D, teleoperations data 1513 may continue to be sent to the teleoperations system 1560 such that remote monitoring of the vehicle by a remote operator may be performed.

Although only a few embodiments have been described in this disclosure, it should be understood that the disclosure may be embodied in many other specific forms without departing from the spirit or the scope of the present disclosure. By way of example, hardware included in an autonomous vehicle has generally be described as including hardware and/or software components. Such hardware components may include, in one embodiment, hardware components configured to provide environmental control. For instance, hardware components may include materials arranged to absorb heat and/or to mitigate condensation. Furthermore, an aggregator/compute arrangement has been described as including camera controls and interfaces, as well as a secondary or backup autonomy system. However, the functionality of an aggregator/compute arrangement may vary widely. That is, an aggregator/compute arrangement is not limited to including a camera control system. Furthermore, the aggregator/compute arrangement may be configured to process any type of sensor data, in addition to or instead of, image data captured by one or more cameras.

In one embodiment, SOMs or SOCs may provide compute capabilities, and may include processors such as central processing units and digital signal processors. As mentioned above, SOMs or SOCs typically include ISPs. While bypassing an ISP on a SOM has been described, it should be appreciated that the disclosure is not limited to bypassing the ISP on the SOM.

Each half of a board in an aggregator/compute arrangement may, in one embodiment, include a fan for cooling. It should be understood that when each half of the board includes a fan, in the event that one fan fails, the other fan may continue to provide cooling within an aggregator/compute arrangement.

In one embodiment, both halves or modules in an aggregator/compute arrangement may be configured to support a teleoperations system, with each half being arranged to substantially control separate sets of cameras. That is, halves of an aggregator/compute arrangement may cooperate to provide teleoperations functionality.

An aggregator/compute arrangement has generally been described as being divided in half, or into two portions, each of which is a power domain. The division of an aggregator/compute arrangement is not limited to being divided into two portions, two halves, or two power domains. For example, an aggregator/compute arrangement may be divided into three or more portions without departing from the spirit or the scope of the disclosure. Further, while each of two or more portions of an aggregator/compute arrangement may have its own power domain, in some instances, some portions may share a power domain.

Sensors of various groups such as sensor group A 1550a and sensor group B 1550b of FIG. 15A have generally been described as separate sensors. In some implementations, however, sensor group B 1550b, as an example, may correspond to redundant internal sensors provided within sensor group A 1550a.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A vehicle capable of operating autonomously or semi-autonomously, the vehicle comprising: a sensor data aggregator that includes a first computing assembly and a second computing assembly, the first computing assembly configured to receive and to process a first set of sensor data from a first set of sensors, the second computing assembly configured to receive and to process a second set of sensor data from a second set of sensors, the first set of sensors including a short range radar and a long range lidar, the second set of sensors including a long range radar and a short range lidar; and a computing system configured to (i) receive the first and second sets of sensor data processed by the sensor data aggregator and (ii) implement a set of primary autonomy functionalities of the vehicle based on the first and second sets of sensor data, wherein the sensor data aggregator is configured to implement a set of backup autonomy functionalities of the vehicle.

2. The vehicle of claim 1, wherein the set of backup autonomy functionalities includes: (i) a set of parallel autonomy functionalities that are implemented concurrently with the computing system implementing the set of primary autonomy functionalities, and (ii) a set of failover autonomy functionalities that are implemented in response to detection of a fault associated with the set of primary autonomy functionalities, wherein the set of failover autonomy functionalities are arranged to cause the vehicle to perform a safe stop when the vehicle is unable to safely operate autonomously.

3. The vehicle of claim 1, wherein the first computing assembly and the second computing assembly are each configured to implement the set of backup autonomy functionalities.

4. The vehicle of claim 3, wherein one of the first computing assembly and the second computing assembly actively implements the backup autonomy functionalities while the other one of the first computing assembly and the second computing assembly is in standby with respect to the backup autonomy functionalities.

5. The vehicle of claim 4, wherein the other one of the first computing assembly and the second computing assembly that is in standby with respect to the backup autonomy functionalities is configured to be triggered to actively implement backup autonomy functionalities in response to detection of a fault.

6. The vehicle of claim 1, wherein the first computing assembly of the sensor data aggregator receives power from a first low voltage power domain of the vehicle and the second computing assembly of the sensor data aggregator receives power from a second low voltage power domain of the vehicle.

7. The vehicle of claim 1, wherein the sensor data aggregator is further configured to implement a set of teleoperations functionalities to enable a remote operator to operate the vehicle.

8. The vehicle of claim 7, wherein the sensor data aggregator includes one or more wireless communication interfaces for transmitting data over a network to support the set of teleoperations functionalities.

9. The vehicle of claim 1, wherein the computing system is configured to receive a third set of sensor data from a third set of sensors and to implement the primary autonomy functionalities of the vehicle based further on the third set of sensor data; and wherein the sensor data aggregator is configured to implement the set of backup autonomy functionalities based on at least a portion of the third set of sensor data.

10. The vehicle system of claim 9, wherein the first set of sensors includes a first set of cameras, the second set of sensors includes a second set of cameras, and the third set of sensors includes a LiDAR and a radar.

11. The vehicle of claim 1, wherein the first computing assembly includes one or more digital signal processors, the one or more digital signal processors being configured to generate a first stream of output data for use by the computing assembly to implement the set of primary autonomy functionalities, a second stream of output data for use by the sensor data aggregator in implementing the set of backup autonomy functionalities, and a third stream of output data for transmission to a remote teleoperations system.

12. A vehicle capable of operating autonomously or semi-autonomously, the vehicle comprising: a sensor data aggregator that includes a first computing assembly and a second computing assembly, the first computing assembly configured to receive and to process a first set of sensor data from a first set of sensors, the second computing assembly configured to receive and to process a second set of sensor data from a second set of sensors; and a computing system configured to (i) receive the first and second sets of sensor data processed by the sensor data aggregator and (ii) implement a set of primary autonomy functionalities of the vehicle based on the first and second sets of sensor data, wherein the sensor data aggregator is configured to implement a set of teleoperations functionalities to enable a remote operator to operate the vehicle, the first set of sensors including a short range radar and a long range lidar, the second set of sensors including a long range radar and a short range lidar.

13. The vehicle of claim 12, wherein the set of teleoperations functionalities includes:
processing the first and second sets of sensor data to generate a data stream;
transmitting, over a wireless network, the data stream to a remote computing system to enable presentation of a video by a computing device of the remote operator;
receiving, over the data network, a set of remote commands input by the remote operator; and
generating a set of vehicle commands based on the set of remote commands.

14. The vehicle of claim 12, wherein the sensor data aggregator is further configured to implement a set of backup autonomy functionalities.

15. A vehicle capable of operating autonomously or semi-autonomously, the vehicle comprising: a computing system configured to implement a set of primary autonomy functionalities of the vehicle; a sensor data aggregator configured to receive and to process a first set of sensor data from a first set of sensors and a second set of sensor data from a second set of sensors, the sensor data aggregator being further configured to forward the processed first and second sets of sensor data to the computing system, the first set of sensors including a short range radar and a long range lidar, the second set of sensors including a long range radar and a short range lidar; a first switch coupled to the computing system and the sensor data aggregator, the first switch being configured to forward a third set of sensor data generated by a third set of sensors to the sensor data aggregator and to the computing system; and a second switch coupled to the computing system and the sensor data aggregator, the second switch being configured to forward a fourth set of sensor data generated by a fourth set of sensors to the sensor data aggregator and to the computing system.

16. The vehicle of claim 15, wherein the sensor data aggregator is further configured to forward the processed first and second sets of sensor data to the computing system directly without the first switch or the second switch.

17. The vehicle of claim 15, wherein the first switch and the second switch are each coupled to a brainstem computer of the vehicle and are each configured to forward primary autonomy commands from the computing system to the brainstem computer and backup autonomy commands from the sensor data aggregator to the brainstem computer.

18. The vehicle of claim 15, wherein the sensor data aggregator comprises a first computing assembly configured to receive and process the first set of sensor data and a second computing assembly configured to receive and process the second set of sensor data; and wherein the first switch is communicatively coupled to a first computing assembly of the sensor data aggregator and the second switch is communicatively coupled to the second computing assembly of the sensor data aggregator.

19. The vehicle of claim 15, further comprising (i) a first power domain that powers the first switch, the first set of sensors, and a first portion of the sensor data aggregator that is configured to process data generated by the first set of sensors, and (ii) a second power domain that powers the second switch, the second set of sensors, and a second portion of the sensor data aggregator that is configured to process data generated by the second set of sensors.

20. A vehicle capable of operating autonomously or semi-autonomously, the vehicle comprising: a computing system configured to implement a set of primary autonomy functionalities of the vehicle; a sensor data aggregator configured to receive and to process a first set of sensor data from a first set of sensors and a second set of sensor data from a second set of sensors, the sensor data aggregator being further configured to forward the processed first and second sets of sensor data to the computing system; a first switch coupled to the computing system and the sensor data aggregator, the first switch being configured to forward a third set of sensor data generated by a third set of sensors to the sensor data aggregator and to the computing system, wherein the first switch is further configured to convert at least a portion of the third set of sensor data from a pulse-per-second (PPS) synchronization scheme to a precision time protocol (PTP) synchronization scheme; and a second switch coupled to the computing system and the sensor data aggregator, the second switch being configured to forward a fourth set of sensor data generated by a fourth set of sensors to the sensor data aggregator and to the computing system.

21. The vehicle of claim 20, further comprising (i) a first power domain that powers the first switch, the first set of sensors, and a first portion of the sensor data aggregator that is configured to process data generated by the first set of sensors, and (ii) a second power domain that powers the second switch, the second set of sensors, and a second portion of the data sensor aggregator that is configured to process data generated by the second set of sensors.

* * * * *